(12) United States Patent
Shields

(10) Patent No.: US 12,114,744 B2
(45) Date of Patent: Oct. 15, 2024

(54) BIOMETRIC LEVER WALLET

(71) Applicant: Michael Peter Shields, Santa Barbara, CA (US)

(72) Inventor: Michael Peter Shields, Santa Barbara, CA (US)

(73) Assignee: TODO BIO S.A.

( * ) Notice: Subject to any disclaimer, the term of this patent is extended or adjusted under 35 U.S.C. 154(b) by 897 days.

(21) Appl. No.: 17/190,555

(22) Filed: Mar. 3, 2021

(65) Prior Publication Data

US 2021/0244146 A1   Aug. 12, 2021

Related U.S. Application Data

(63) Continuation of application No. PCT/US2019/050093, filed on Sep. 6, 2019, and a continuation of application No. 16/125,482, filed on Sep. 7, 2018, now Pat. No. 11,039,671.

(51) Int. Cl.
*A45C 11/18* (2006.01)
*A45C 1/06* (2006.01)
*A45C 11/00* (2006.01)
*H04W 4/80* (2018.01)

(52) U.S. Cl.
CPC .............. *A45C 11/182* (2013.01); *A45C 1/06* (2013.01); *H04W 4/80* (2018.02); *A45C 2001/065* (2013.01); *A45C 2001/067* (2013.01); *A45C 2011/002* (2013.01); *A45C 2011/186* (2013.01); *A45C 2200/15* (2013.01)

(58) Field of Classification Search
CPC ... A45C 11/182; A45C 2001/065; A45C 1/06; A45C 2001/06; H04W 4/80
See application file for complete search history.

(56) References Cited

U.S. PATENT DOCUMENTS

| | | | |
|---|---|---|---|
| 4,682,310 A | 7/1987 | Lund | |
| 5,718,329 A * | 2/1998 | Ippolito | ............... A45C 11/182 150/147 |
| 5,878,874 A | 3/1999 | Weggelaar | |
| 6,082,422 A | 7/2000 | Kaminski | |
| 6,327,749 B1 | 12/2001 | Antinone | |
| 6,637,632 B2 | 10/2003 | Chiku | |
| 8,567,459 B2 | 10/2013 | Kitchen | |
| 9,907,375 B1 * | 3/2018 | Kitchen | ................... A45C 1/06 |
| 10,331,876 B2 | 6/2019 | Perotti | |
| 10,339,291 B2 | 7/2019 | Ibrahim et al. | |
| 10,343,650 B1 | 7/2019 | Ahmad | |
| 10,366,296 B2 | 7/2019 | Mapen et al. | |
| 10,387,634 B1 | 8/2019 | Lindell et al. | |
| 10,389,711 B2 | 8/2019 | Abreu | |
| 10,390,197 B1 | 8/2019 | Tuomikoski et al. | |
| 10,395,087 B2 | 8/2019 | Li | |

(Continued)

FOREIGN PATENT DOCUMENTS

WO   WO2013095434 A1   6/2013
WO   WO2015064799 A1   5/2015

*Primary Examiner* — Don M Anderson
*Assistant Examiner* — Justin Caudill
(74) *Attorney, Agent, or Firm* — Paul D. Chancellor; Ocean Law

(57) ABSTRACT

A biometric lever wallet comprises a mechanical assembly for holding bills and credit cards and biometric security measures for authenticating a wallet user.

20 Claims, 23 Drawing Sheets

(56) References Cited

U.S. PATENT DOCUMENTS

| | | |
|---|---|---|
| 2002/0186131 A1* | 12/2002 | Fettis ............... G08B 13/06 340/568.1 |
| 2004/0216825 A1 | 11/2004 | Radochonski |
| 2006/0201594 A1 | 9/2006 | Carmichael |
| 2013/0061990 A1 | 3/2013 | Smya |
| 2013/0104350 A1 | 5/2013 | Vlasdeck |
| 2013/0135103 A1 | 5/2013 | Hollaway |
| 2014/0013551 A1 | 1/2014 | Thompson |
| 2014/0096880 A1 | 4/2014 | Yeung |
| 2014/0223584 A1* | 8/2014 | Cabouli ............ G07F 7/1008 726/34 |
| 2015/0216228 A1 | 8/2015 | Roila |
| 2016/0098878 A1 | 4/2016 | Cabouli |
| 2016/0206065 A1 | 7/2016 | Ehrlich |
| 2020/0286070 A1 | 9/2020 | Garrett |

\* cited by examiner

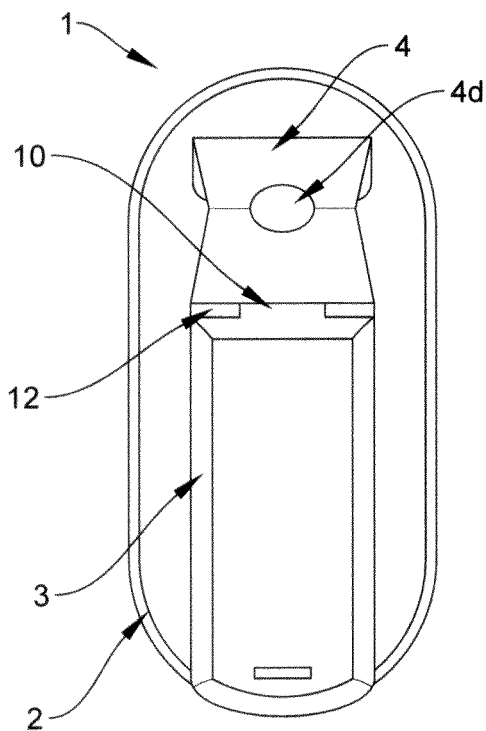
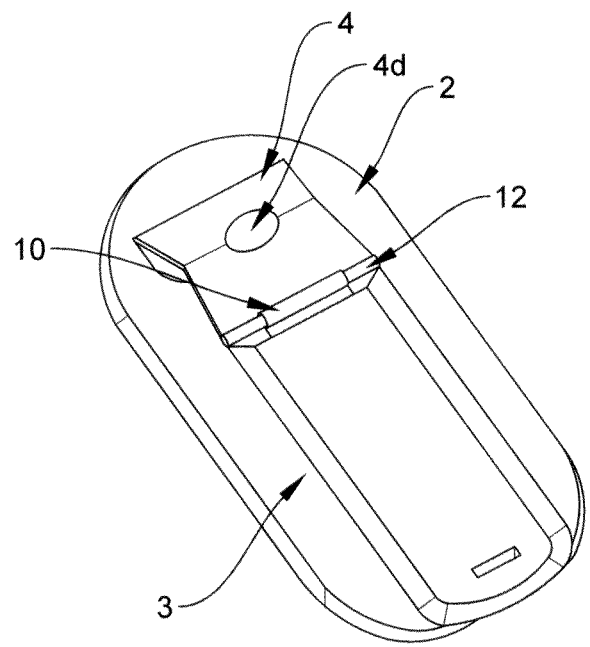
FIG. 18  FIG. 19
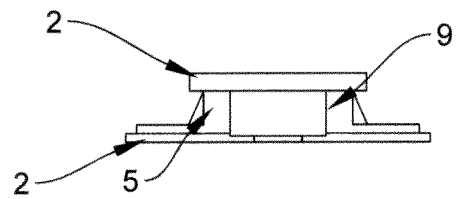
FIG. 20
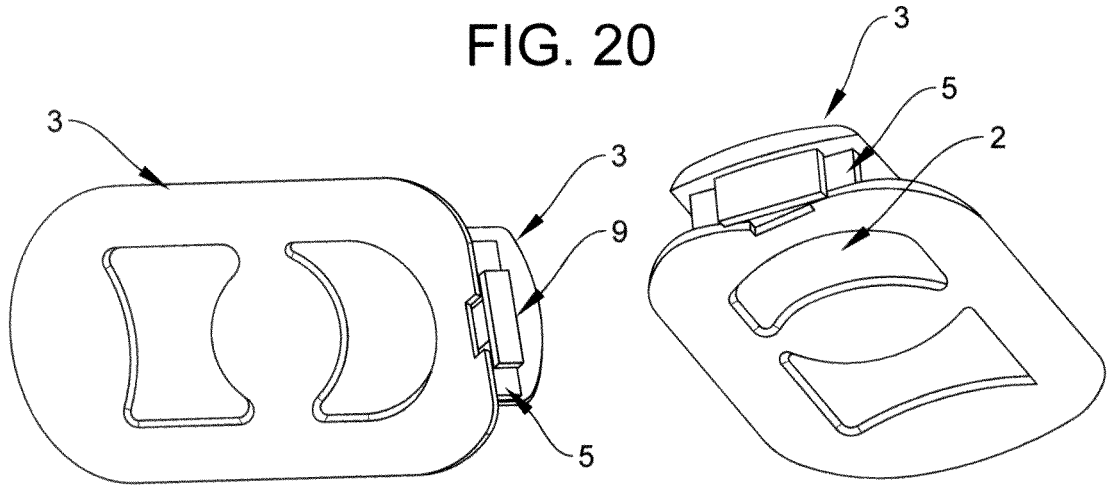
FIG. 21  FIG. 22

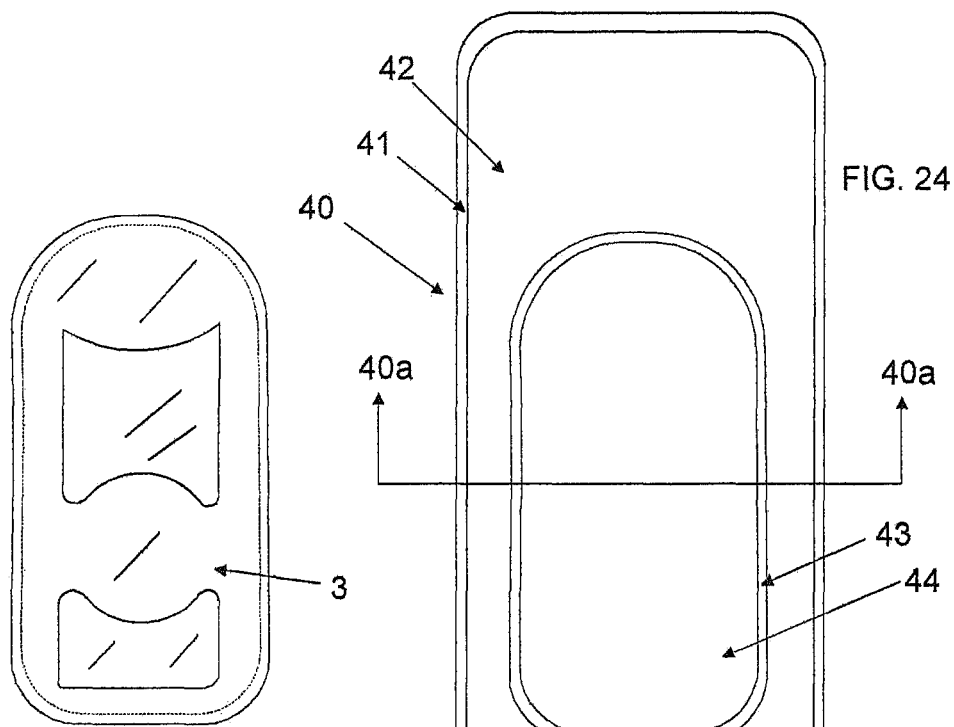
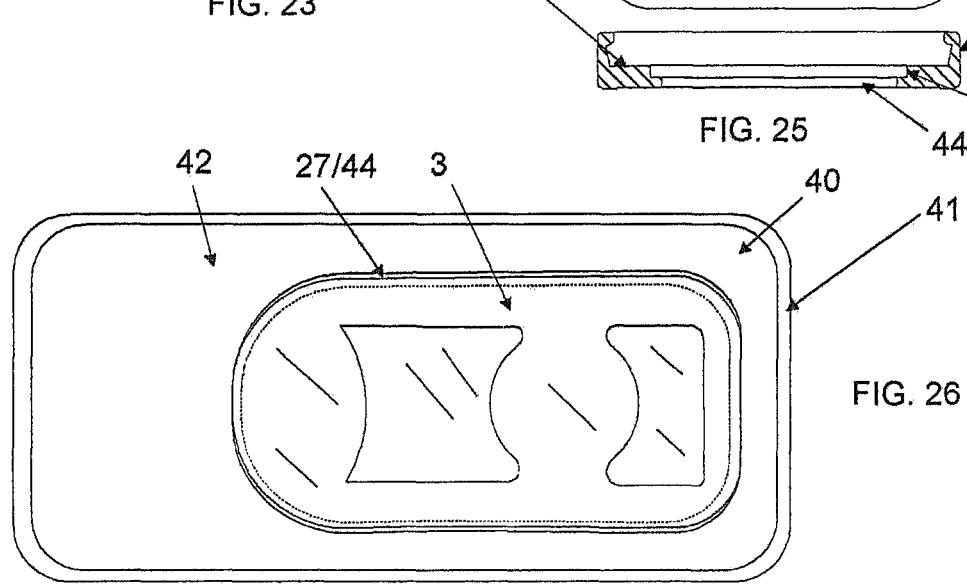
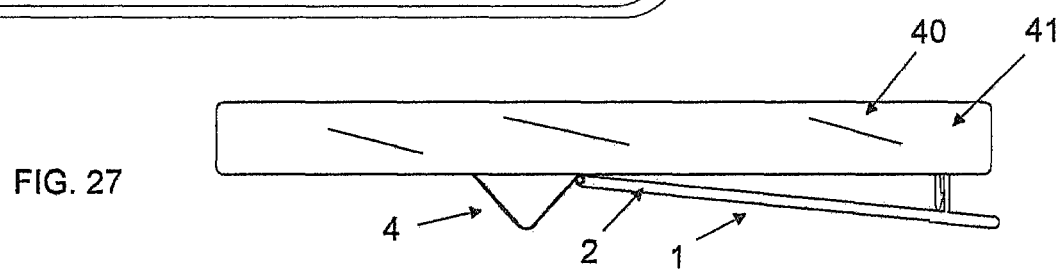

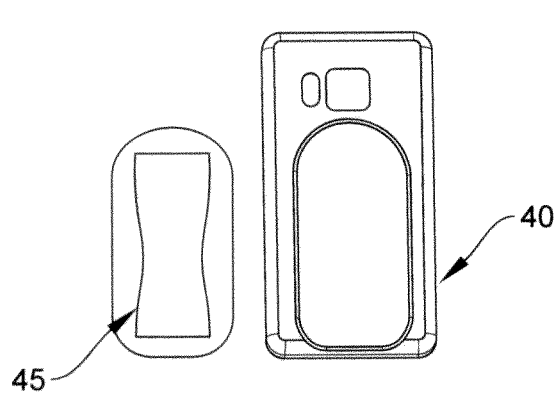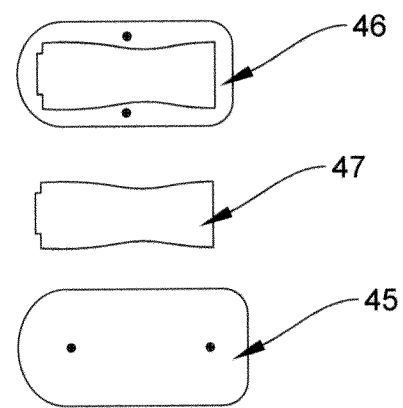
FIG. 28    FIG. 29
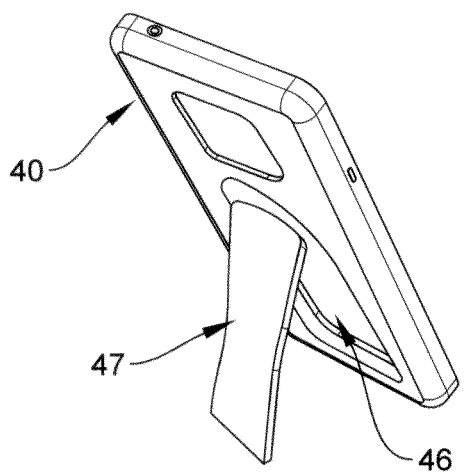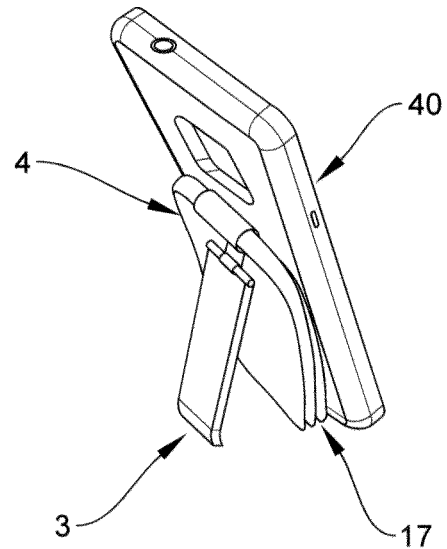
FIG. 30    FIG. 31

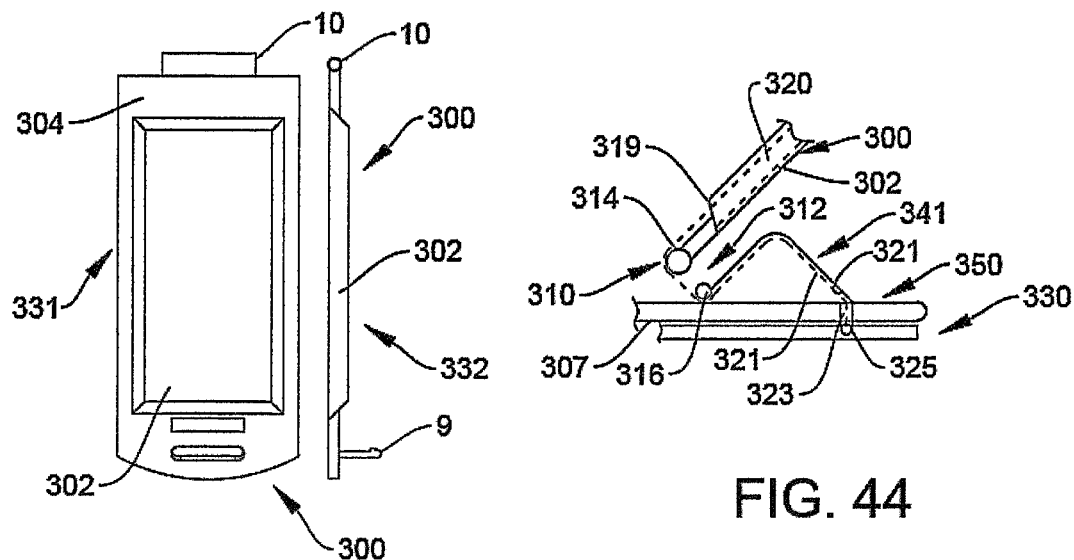
FIG. 42
FIG. 44
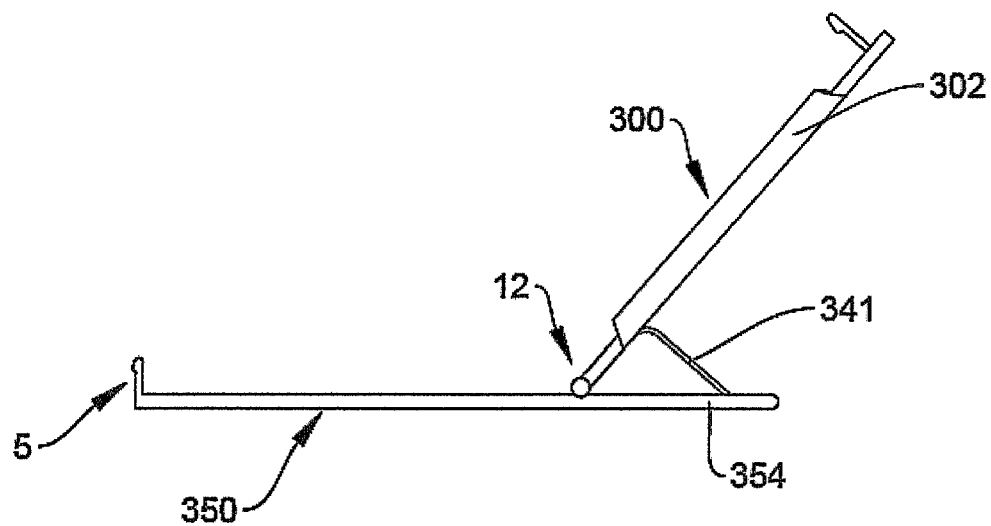
FIG. 43

BIOMETRIC LEVER WALLET

PRIORITY CLAIM AND INCORPORATION BY REFERENCE

This application is a continuation of PCT Pat. App. No. PCT/US19/50093 filed Sep. 6, 2019. This application claims the benefit of U.S. Prov. Pat. App. No. 62/781,458 filed Dec. 18, 2018. This application is a continuation of U.S. application Ser. No. 16/125,482 filed Sep. 7, 2018. This application incorporates by reference U.S. Pat. Nos. 10,395,087, 10,390,197, 10,389,711, 10,387,634, 10,366,296, 10,343, 650, 10, 339,291, 10,331,867.

FIELD OF THE INVENTION

The present invention is broadly directed to a lever wallet which may have integral biometric security features.

BACKGROUND OF THE INVENTION

For over one hundred years, money clips have been well known in the art. An example is shown in U.S. Pat. No. 1,899,753, showing a simple metal clip capable of engaging dollar bills. The '753 patent discloses a common failure of prior art money clips, i.e., the sole engaging means for bills or credit cards is spring pressure generally provided by a U-shaped metal clip. Agitation or abrasion of the bills or credit cards in such a money clip easily dislodges them from the money clip.

U.S. Pat. No. 6,357,084 attempts to improve the security of the prior art money clips by providing a band that will generally ineffectively gather the bills and credit cards across their lengths. U.S. Pat. No. 7,640,632 continues in that concept with an additional belt across the short sides of gathered credit cards.

As described above, another equally important problem with prior art money clips and credit card holders using a single invariable width between metal parts to provide spring pressure to secure such items. There is a need for a device which is capable of providing a money clip function with a much greater capacity to engage a single credit card or several more with equal security.

Further, money clips in the prior art are of limited functionality, excepting as described in U.S. Pat. No. 4,768, 648 that combines with a simple money clip a calculator.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

SUMMARY OF THE INVENTION

The present invention is a biometric wallet having a lever. The invention may be referred to variously as a biometric lever wallet, a pocketable device, a a lever wallet, a biometric wallet or a wallet or similar.

The invention provides a lever or similar structure and may have an integral antenna and/or fingerprint reader. The lever may be mounted on a base plate for capturing sheet form items such as currency, credit cards, and the like between the lever and the base. The lever may be a rigid lever and/or the base may be a rigid base. The antenna may for near field communications ("NFC") and contactless communications with devices such as terminals including transaction terminals that form a part of a point of sale system.

Embodiments of the invention provide spring pressure and a capture means to provide dual security for those items. The invention holder may have a bottom plate and a latch plate connected by spring means so that the latch plate is hinge connected at a first end to a free, distal end of the V-shaped spring means, where a second end of the latch plate can latch to a distal end of the bottom plate. A proximal end of the V-shaped spring means may be non-rotatably fixed to the bottom plate so that an unlatched latch plate can rotate up and onto a top surface of one side of the spring means and cause it to lift from the top surface of the bottom plate by way of mechanical and lever advantage.

In another embodiment of the present invention, the invention holder can be incorporated into a backside of a removable cellular phone case for a typical rectangular touch screen cell phone, so that a user can securely carry their credit cards and bills in the same assembled device as their cell phone.

In yet another embodiment of the present invention, the invention holder's latch plate is formed with a cavity in its top surface into which a housing is fixed, where the housing contains a microprocessor, software, user interface (including a small touchscreen), and wireless communication means to communicate by way of near field communications or Bluetooth standards with a cellular phone of a user, so that this smart watch device incorporated into the latch plate performs functions of the well known smart watches that have similar form factors but secured to a wrist of a user. The invention smart watch device is superior to the wrist-borne devices in that the invention smart watch device is better protected from potential damage and serves the function of both a smart watch and a holder for credit cards and bills.

In yet another embodiment, a pocketable device comprises: a mechanical assembly for holding bills and credit cards; the mechanical assembly including a latch plate or upper jaw and a spring plate or lower jaw, each jaw having a flat, rectangular shape; a "V" shaped spring having a first end affixed to the lower jaw and a second end biased toward the lower jaw; and, the upper jaw having a pinned end rotatably connected to the spring second end and opposite the pinned end a latch end for interengaging a mating latch; wherein bills and cards placed between the upper jaw and lower jaw are compressed between the spring second end and the lower jaw and wherein when latched the upper jaw is free to pivot about the pin such that the upper jaw can move through an angle of less than 10 degrees and when unlatched the upper jaw is free to pivot about the pin through an angle that widens the "V" of the spring.

In an embodiment, a biometric wallet comprises: a spring connecting a lever and a base; a spring first end coupled to a base spring end and a spring second end rotatably fixed to a lever spring end; the spring second end biased toward, but movable away from the base for removably capturing one or more sheet form items therebetween; a first lever position with the lever over the base such that an external lever surface is visible and an internal lever surface is not visible; a second lever position with an angle between the lever and the base that is an obtuse angle; a lever latch end opposite the lever spring end with a first latch part; and, a base latch end opposite the base spring end with a second latch part; wherein the wallet is closed when the latch parts are engaged.

Some embodiments of the wallet comprise wherein the space between the spring ends is for receiving a card edge and a latch part is for preventing rotation of the opposite card edge.

Some embodiments of the wallet comprise wherein lifting the lever such that the biased spring end is lifted away from the base allows all items held by the spring to be removed from the wallet.

Some embodiments of the wallet comprise wherein the approximate dimensions of the card are 3⅜×2⅛ inches.

Some embodiments of the wallet comprise: near the lever spring end, a fingerprint reader accessible from the lever internal surface; and, a wallet antenna for radio communications between the wallet and near field communications (NFC) devices.

Some embodiments of the wallet comprise: a card copying function wherein a card received in the mail is validated via phone or internet and all or part of the card digital content is transferred to a wallet memory.

Some embodiments of the wallet comprise wherein a fingerprint of an authorized card user is saved to a wallet memory.

Some embodiments of the wallet comprise wherein a non-biometric transaction using the card is replaced by a biometric transaction using the wallet when wallet communications with a near field device indicate card credentials being presented are for a valid card used by a person whose fingerprint matches a facsimile fingerprint stored in the wallet.

Some embodiments of the wallet comprise wherein the allowable value of a transaction using the biometric wallet is greater than the allowable value of a transaction using the card because the system processing the transaction receives an indication from the wallet that a biometric transaction is taking place.

Some embodiments of the wallet comprise: a fingerprint reader accessible from a lever internal surface; and, electronics for saving a facsimile of a fingerprint.

Some embodiments of the wallet comprise a card copying function wherein a card received in the mail is enrolled by steps including storage of a facsimile of the recipient's fingerprint in a card memory and verification via phone or internet that this step has been completed; and, transfer of all or a part of the card digital contents to a wallet memory.

Some embodiments of the wallet comprise wherein a fingerprint reader on the card provides the recipient's facsimile fingerprint.

Some embodiments of the wallet comprise wherein the person who saved a facsimile fingerprint on the card also saves a facsimile fingerprint to a wallet memory.

Some embodiments of the wallet comprise wherein a transaction using the card is replaced by a transaction using the wallet when wallet communications with a near field device indicate card credentials being presented are for a valid card used by a person whose fingerprint matches a facsimile fingerprint stored in the wallet.

Some embodiments of the wallet comprise a radio frequency blocker in the wallet base for preventing near field communications with cards held by the wallet.

Some embodiments of the wallet comprise wherein a wallet antenna is located in the lever such that when the lever is rotated away from the base the wallet antenna is separated from the radio frequency blocker by a distance sufficient to allow the wallet antenna to communicate with NFC transaction devices.

Some embodiments of the wallet comprise: the wallet holding in memory credentials associated with multiple cards; and, a wallet first LCD screen for selecting one of the multiple cards.

Some embodiments of the wallet comprise wherein the first LCD screen is accessible from the lever internal surface such that when the lever is in the first position both the fingerprint reader and the first LCD screen are protected by the base.

Some embodiments of the wallet comprise wherein a transaction using the selected card is replaced by a transaction using the wallet when wallet communications with a near field device indicate the card credentials being presented are for a valid card used by a person whose fingerprint matches a facsimile fingerprint stored in the wallet.

Some embodiments of the wallet comprise wherein one or both of the first wallet LCD screen and a second wallet LCD screen present a login request and upon a successful login present a selection of classes including "payments" and a selection of class types including "Bank Of America."

Some embodiments of the wallet comprise wherein the second wallet LCD screen is located at the external lever surface.

BRIEF DESCRIPTION OF THE DRAWINGS

FIGS. 18, 19, 20, 21 and 22 are respectively the holder of FIG. 1 shown in top view, top perspective view, end view, bottom slanted view and bottom perspective view.

FIG. 23 is a bottom view of the invention holder of FIG. 1 showing in broken line a cutaway edge.

FIG. 24 is a top view of a cell phone case with an opening to receive into a mating cutout the top portion of the invention holder of FIG. 23.

FIG. 25 is the section 40a of FIG. 24.

FIG. 26 is the holder of FIG. 23 mated to the opening in the cell phone case of FIG. 24.

FIG. 27 is a side view of the assembly of FIG. 26 with a cell phone secured in the cell phone case to thereby secure the invention holder to a floor of the cell phone case and to present to the rear of the cell phone and cell phone case assembly the holder portion of the invention holder.

FIG. 28 shows the cell phone case of FIG. 24 and a top view of an insert to replace the invention holder as shown in FIG. 26.

FIG. 29 is a top view of the insert of FIG. 28 and also separated into a base and extendable plate.

FIG. 30 is the cell phone case and cell phone of FIG. 27 shown supported from the extendable plate of the insert of FIG. 29.

FIG. 31 is the assembly of FIG. 27 shown with the latch plate unlatched to provide a support similar to that provided by the extendable plate of the insert of FIG. 30.

FIG. 42 shows a lever adapted to hold a battery.

FIG. 43 shows the lever of FIG. 42 mounted on a spring plate.

FIG. 44 shows a power supply cable used with the battery and lever of FIG. 42.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The present invention is described in multiple embodiments as evident from the associated figures and text which follows.

Figure 1:
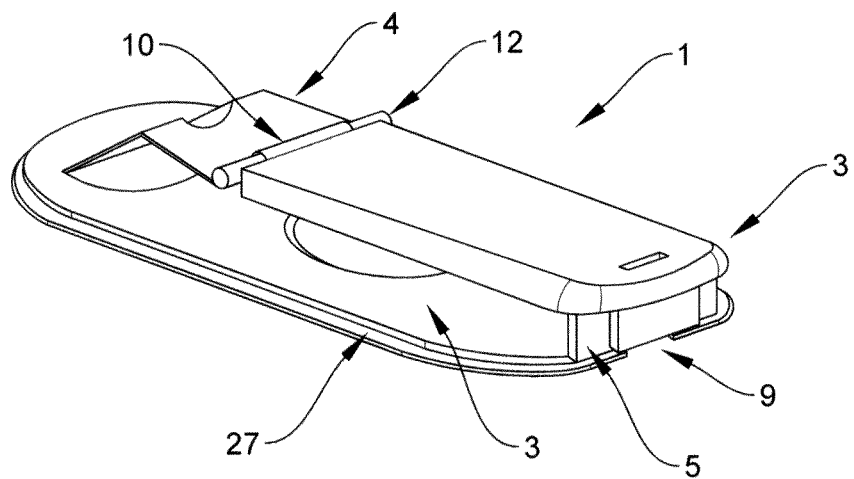
FIG. 1 is a top perspective view of the invention holder in a closed position.
Figure 2:
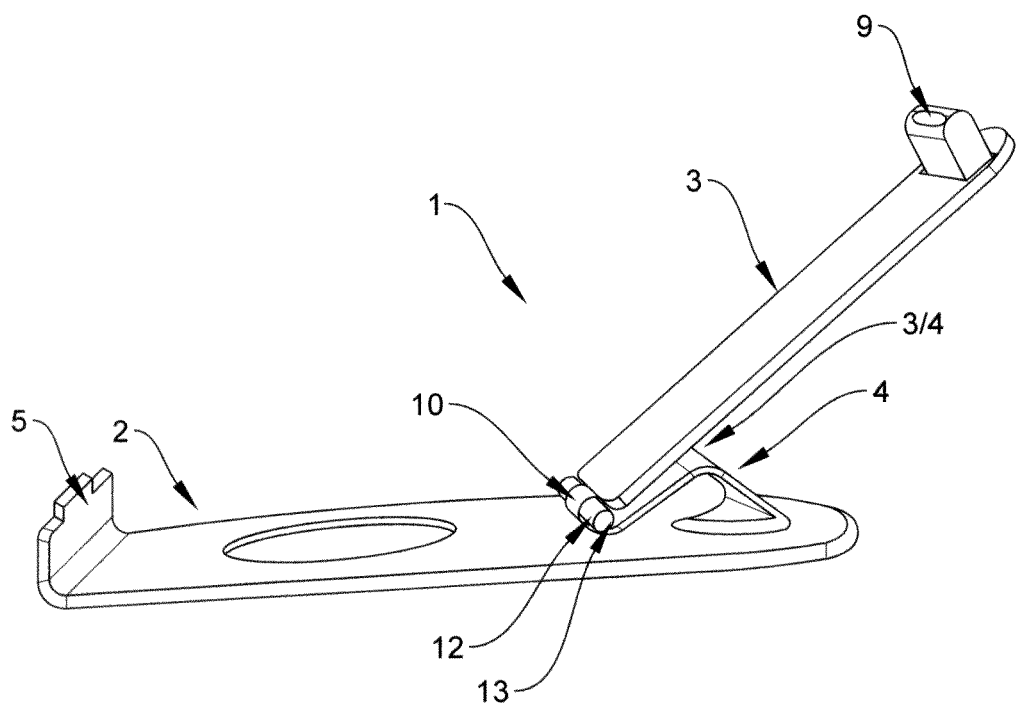
FIG. 2 is a side perspective view of the invention holder.

FIG. 1 is a top perspective view of the invention holder 1 in a closed position showing a bottom plate 2, a latch plate 3 and a spring means 4, where spring means 4 connects to latch plate 3 at a pinned hinge connection comprising cylinder 10 at a first end of latch plate 3 and two aligned pin cylinders 12 with a straight metal pin 13 providing a pivot that allows latch plate 3 to rotate about cylinder 10 from the closed position shown in FIG. 1 to the open position shown in FIG. 2. Latch plate 3 comprises a second end with a downward latch piece 9 which releasably latches to latch piece 5 extending up from bottom plate 2. Spring means 4 comprises a V-shape of a flat plate of spring steel, with two pin cylinders forming a distal edge at the contact portion, where the distal edge is strongly urged against a top surface of the bottom plate 2 by way of connection of a proximal edge 4a being non-rotatably fixed relative to the plane of bottom plate 2. The V-shape of spring means 4 causes the contact portion to press strongly against the top surface of bottom plate 2 at the distal edge because of the fixing of the proximal edge structurally to the plane of the bottom plate 2. In a one embodiment of spring means 4 shown in FIGS. 1 and 2, a spring plate secures the proximal edge of spring means 4, where after the spring plate is inserted into a body slot formed in bottom plate 2 as described below.

It will clear from this description that there are many ways in which the connection of a proximal edge 4a being non-rotatably fixed relative to the plane of bottom plate 2 may be accomplished. One such manner is described below, i.e., the bottom plate is formed from a single metal plate and the proximal edge 4a being non-rotatably fixed relative to the plane of bottom plate 2 by way of welding said proximal edge 4a. Another such method may be to provide a metal or other extension from proximal edge 4a of spring means 4 such that the extension can be fixed by rivets or embedded in bottom plate 2 to accomplish the desired fixing of proximal edge 4a.

In a similar consideration, spring means 4 may be formed of alternate embodiments than a single V-shaped thin plate of spring steel. For example the spring may have a curved shape. For example the spring may have a curved shape such as a semi-circular shape or near semi-circular shape. For example, the spring may be a coil spring with ends that trace out a "V" shape. For example, the spring may be a coil spring with ends that trace out a near semi-circular shape. For example the spring may be a nearly flat or flat spring.

In a particular alternative spring embodiment, spring means 4 may be formed using two plates equivalent to sections 4b. These plates can be joined by a spiral spring to accomplish the desired function of having a generally V-shape spring means, a distal side of which is contacted with an upper surface of latch plate 3 to accomplish the objects of the invention to lift the contact portion of spring means 4 upward from the top surface of bottom plate 2.

FIG. 2 shows that an interface 3/4 is formed between a top surface of latch plate 3 and a lower part of the V-shape spring of spring means 4. One of the disadvantages of the prior art with respect to spring means provided for holding credit cards and bills is that the user lacks lever assistance to open the spring means. In the present invention, FIG. 2 shows that a user continuing the rotation of the latch plate 3 about the pivot hinge connection formed with spring means 4 that the distal edge of spring means 4 will be lifted off its urged position against a top surface of bottom plate 2 by way of the mechanical advantage provided by turning a plate that latches to secure credit cards and bills on the top surface of bottom plate 2 in place into a lever for lifting the contact portion of spring means 4 away from the top surface of bottom plate 2 so that credit cards and bills can easily be inserted without fighting against the spring means 4 to cause that insertion. FIGS. 3 to 9 show the invention holder performing those steps.

Figure 3:
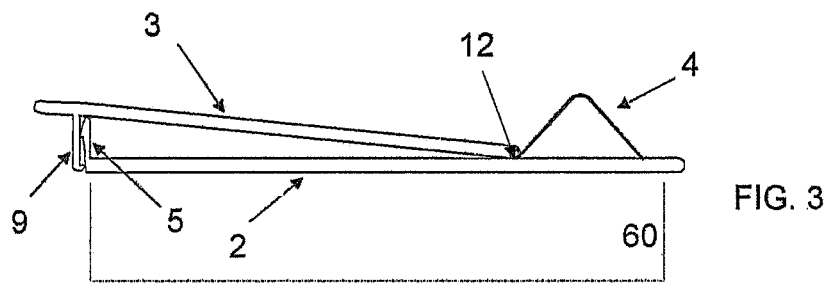
FIG. 3 is side view a side perspective view of the invention in FIG. 1.

FIG. 3 is side view a side perspective view of the invention holder 1 in FIG. 1 showing latch plate 3 engaged by latch piece 9 to latch piece 5 of the bottom plate 2. The contact portion of spring means 4 is shown at cylinders 12 being urged against a top surface of bottom plate 2. Broken lines 60 indicate that a sealable coin purse can be fixed to a bottom surface of bottom plate 2.

Figure 4:
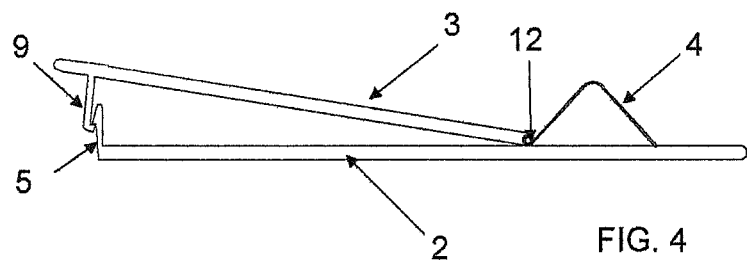
FIG. 4 is the holder of FIG. 3 with a latch plate lifted to a latching notch.

FIG. 4 is the holder 1 of FIG. 3 with a latch plate 2 lifted to latching notches of latching pieces 9 and 5.

Figure 5:
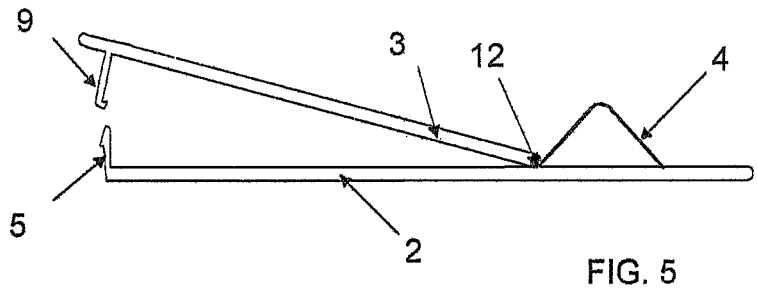
FIG. 5 is the holder of FIG. 4 with the latch plate free of a latch.

FIG. 5 is the holder 1 of FIG. 4 with the latch plate 3 having its latching piece 9 free of a latch engagement with latching piece 5.

Figure 6:
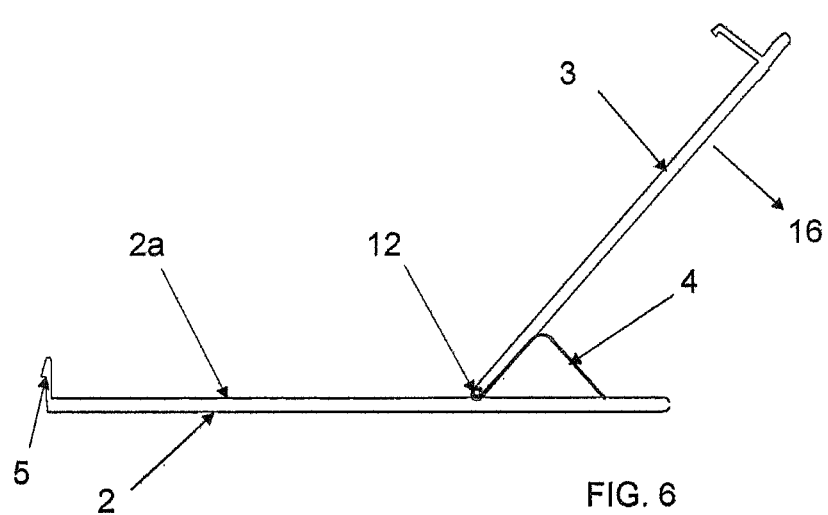
FIG. 6 is the holder of FIG. 5 with the latch plate moved to the open position shown in FIG. 2.

FIG. 6 is the holder 1 of FIG. 5 with the latch plate 2 moved to the open position shown in FIG. 2, where a user presses upon latch plate 2 in direction 16 to cause the contact portion of spring means 4 to lift from the top surface of bottom plate 2.

Figure 7:
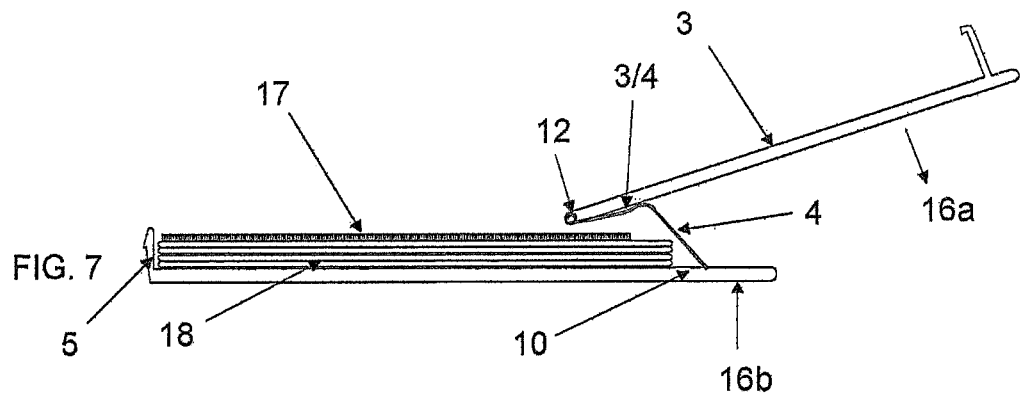
FIG. 7 is the holder of FIG. 6 with the latch plate pressed in a spring opening direction so that credit cards and bills can be inserted between a bottom plate and a spring contact.

FIG. 7 is the holder 1 of FIG. 6 with the latch plate pressed in a spring opening direction 16a and a top end of bottom plate 2 pressed in direction 16b so that credit cards 18 and bills 17 can be inserted between a bottom plate and the contact portion of spring means 4. Note that credit cards 18 and bills 17 are insertable upon and are support upon the top surface of the bottom plate 2 without interference with the contact portion of spring means 4. This position of the invention holder 1 is also the position from which credit cards 18 and bills 17 can be easily removed from the invention holder 1. In another embodiment of the latch that connects the latch plate 3 to bottom plate 2, pieces 5 and 9 may have mating, relatively vertical notches similar to the to those shown in FIG. 7 so that an underside of latch plate 3 is fixed closer to a top surface of cards 17 or bills 18.

Referring again to FIG. 7, note that with latch plate 3 in the entirely open position, credit cards cannot slide inadvertently to the left and out of the holder. They cannot slide out of the holder to the right or upwards because spring means 4 bars that movement. Flexible bills 17 can easily be lifted upward and be removed in a direction into or out of the drawing figure, i.e., from the sides of the holder, for easy access while eliminating the potential of sliding out to the left or right.

Figure 8:
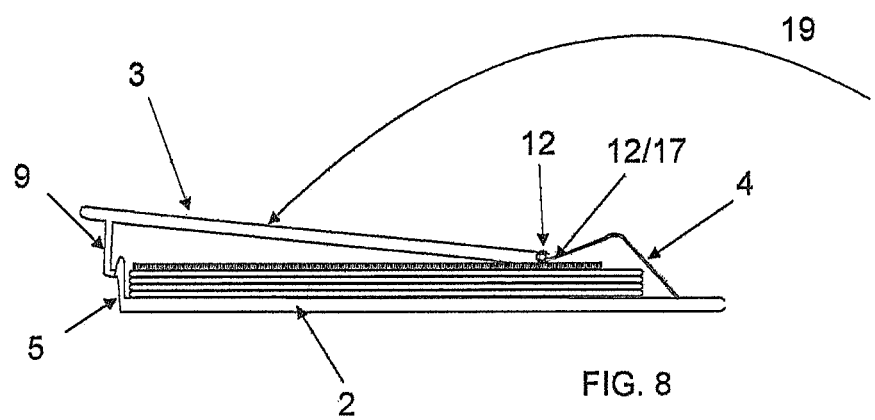
FIG. 8 is the holder of FIG. 7 with the latch plate released and returned to the partly latched position of FIG. 4.

FIG. 8 is the holder 1 of FIG. 7 with the latch plate 3 released and returned in path 19 to the partly latched position of FIG. 4.

Figure 9:
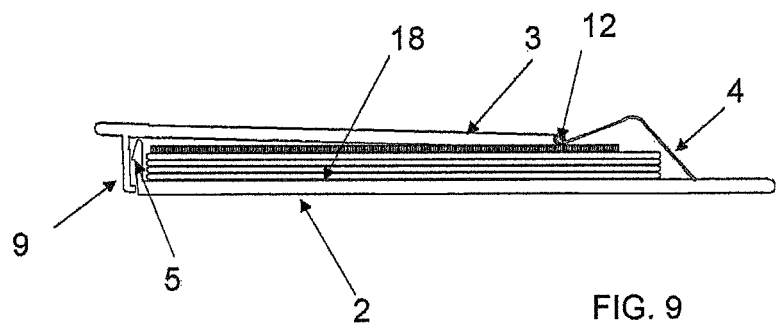
FIG. 9 is the holder of FIG. 8 with the latch plate returned to the fully closed position of FIG. 1.

FIG. 9 is the holder of FIG. 8 with the latch plate 2 returned to the fully closed position of FIG. 1. This position provides dual security. First, the contact portion of the spring means 4 is strongly pressed upon a top surface of the credit cards 18 and bills 17 to secure them to the top surface of bottom plate 2 and latch plate 3 covers the top surface of credit cards 18 and bills 17 and creates a latched space between the underside of latch plate 3 and a top surface of bottom plate 3 within which the credit cards 18 and bills 17 are held securely.

Figure 10:
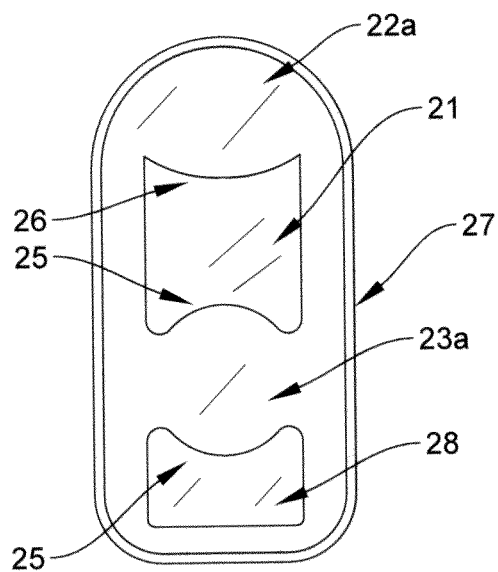
FIGS. 10 and 11 are respectively a bottom view and top perspective view of the bottom plate of the invention holder.
Figure 11:
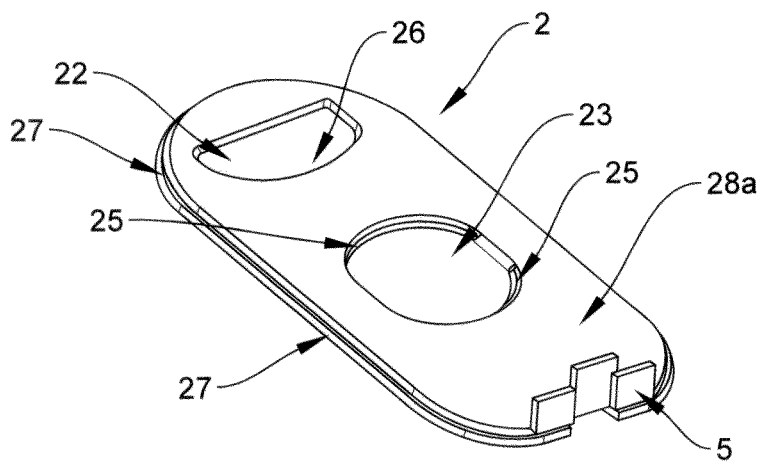

FIGS. 10 and 11 are respectively a bottom view and top perspective view of the bottom plate 2 of the invention holder 1, where bottom plate 2 is provided with an original thickness 3a (FIG. 12) into which are formed impressions and slots to provide a means for insertion and securing of a spring plate 30 (FIGS. 15-17) to which the proximal end 4a of spring means 4 is fixed, thereby forming a non-rotatable connection between a proximal edge of spring means 4 and a plane of the bottom plate 2.

Impressions 21 and 28 (with opposite sides respectively of sections 21a and 28a) are formed in an underside of bottom plate 3 that mate to and connection with impressions 22 and 23 (with opposite sides respectively of sections 22a and 23a) by way of slots 25 and 26. This arrangement of slots and impressions provides that a flat steel plate can be inserted in slog 26 in direction 29a, continued to be inserted through slots 25 in direction 29b, and then extended into impression 28 in direction 29c. After taking that action a flat metal plate will be seated firmly into bottom plate 2 for the secure location for the proximal end of spring means 4.

Figure 12:
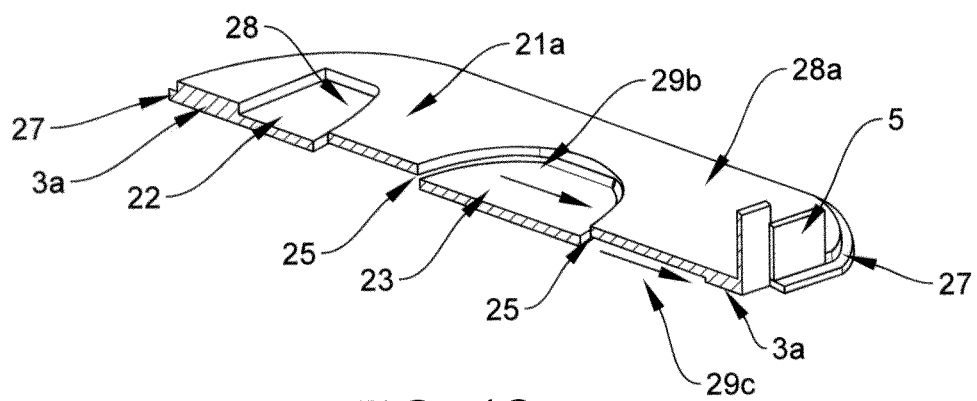
FIG. 12 is the bottom plate of FIG. 11 shown in cutaway view so that insertion slots for a spring plate are shown.

FIG. 12 is a cross-section of FIG. 11.

Figure 13:
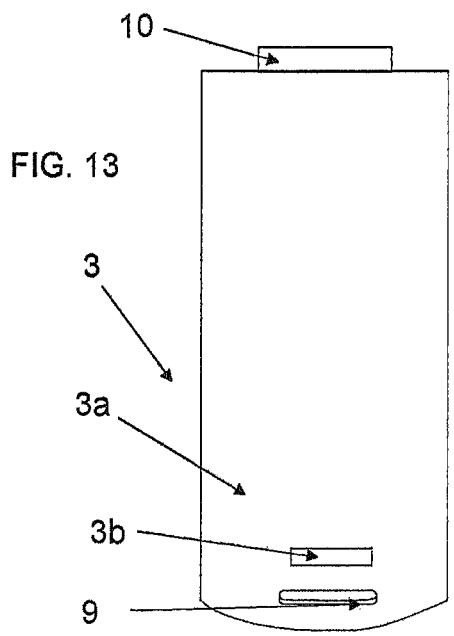
FIGS. 13 and 14 are respectively top and side views of the latch plate of the invention holder.
Figure 14:
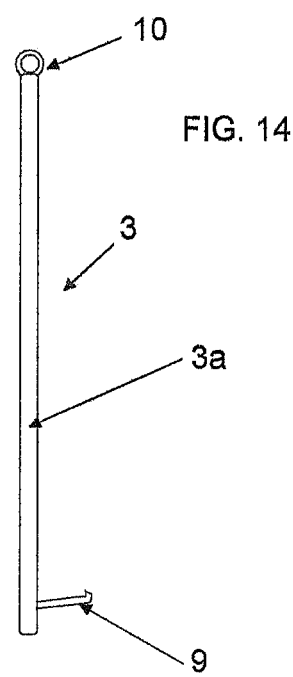

FIGS. 13 and 14 are respectively top and side views of the latch plate 3 of the invention holder, having a solid body 3a preferably of polymer. More preferably, the polymer of body 3a comprises carbon fiber or appropriate metal so that, in combination with a spring plate located in bottom plate 2, credit card secured in the invention holder shall not be capable of being hacked by near field communications due to metallic interference provided by the spring plate and the content of body 3a. This is commonly referred to as RFID protection.

Figure 15:
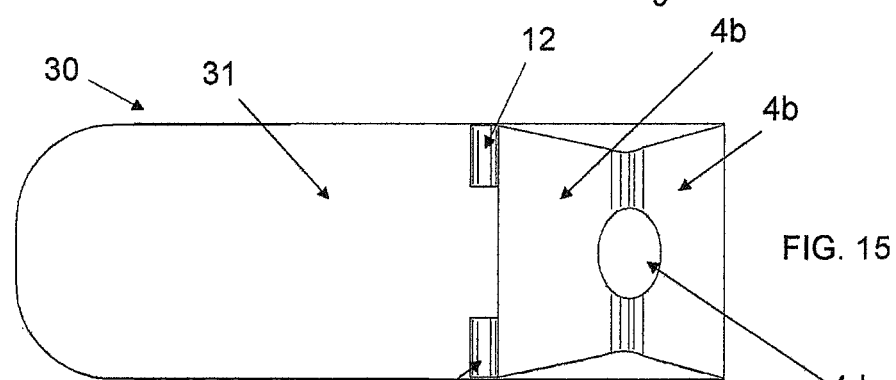
FIGS. 15, 16 and 17 are respectively top, and bottom views of the spring plate of the invention holder.
Figure 16:
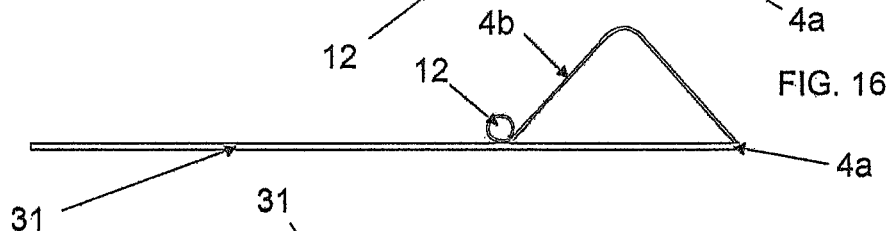
Figure 17:
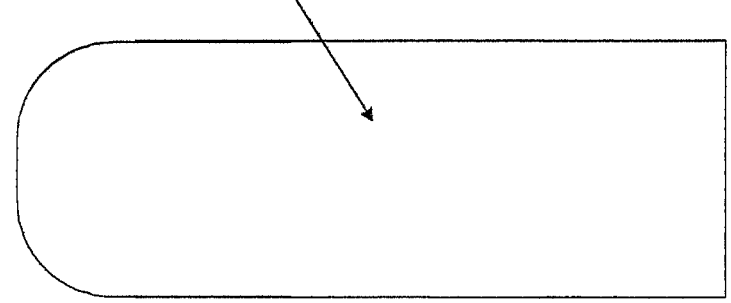

FIGS. 15, 16 and 17 are respectively top, and bottom views of the spring plate 30 of the invention holder, where spring means 4 comprises proximal and distal sides 4b of the V-shape, cylinders 12 at a contact portion, and a proximal edge 4a which is fixed to a top edge of a flat metal plate 31, which is adapted to be inserted into the arrangement of impressions and slots of the bottom plate as described above.

An opening 4d is provided so that a cell phone embodiment of the invention allows a user to insert a side or tip of a forefinger to provide support when a user is making a cell phone call.

FIGS. 18, 19, 20, 21 and 22 are respectively the holder 1 of FIG. 1 shown in top view, top perspective view, end view, bottom slanted view and bottom perspective view.

FIG. 23 is a bottom view of the invention holder of FIG. 1 showing in broken line a cutaway edge of bottom plate 3.

FIG. 24 is a top view of a cell phone case 40 with a floor 42 and sidewalls 41 with an opening 44 and a mating ledge 43 to receive the top portion of the invention holder 1 of FIG. 23. FIG. 25 is the section 40a of FIG. 24 showing a mating ledge 43 and opening 44. A periphery of opening 44 may alternately be provided with convex or concave surface so that an outer edge of bottom plate 2 may be formed respectively in a concave or convex shape to snap fit into case 40. Further, said periphery can be rounded and provided with an elastomer surface for securely engaging an outside edge of bottom plate 2.

FIG. 26 is the holder 1 of FIG. 23 mated at interface 27/43 to the opening in the cell phone case 40 of FIG. 24.

FIG. 27 is a side view of the assembly of FIG. 26 with a cell phone (not shown but entirely encased in the case 40) secured in the cell phone case 40 to thereby secure the invention holder 1 to a floor of the cell phone case 40 and to present to the rear of the cell phone and cell phone case assembly the holder portion of the invention holder 1 so that credit cards 18 and bills 17 can be secured to a backside of a user's cell phone.

FIG. 28 shows the cell phone case 40 of FIG. 24 and a top view of an insert 45 to replace the invention holder 1 as shown in FIG. 26.

FIG. 29 is a top view of the insert 45 of FIG. 28 and also separated into a base 46 and extendable plate 47.

FIG. 30 is the cell phone case 40 and cell phone of FIG. 27 shown supported from the extendable plate 47 of the insert 45 of FIG. 29, where the extendable plate at a lower free edge has incorporated into it a surface material of elastomer with a high coefficient of friction to resist sliding on a smooth surface and a limitation of rotation away from the backside of the cell phone case to 90 degrees or less.

FIG. 31 is the assembly of FIG. 27 shown with the latch plate 2 unlatched to provide a support similar to that provided by the extendable plate 47 of the insert 45 of FIG. 30.

Figure 32:
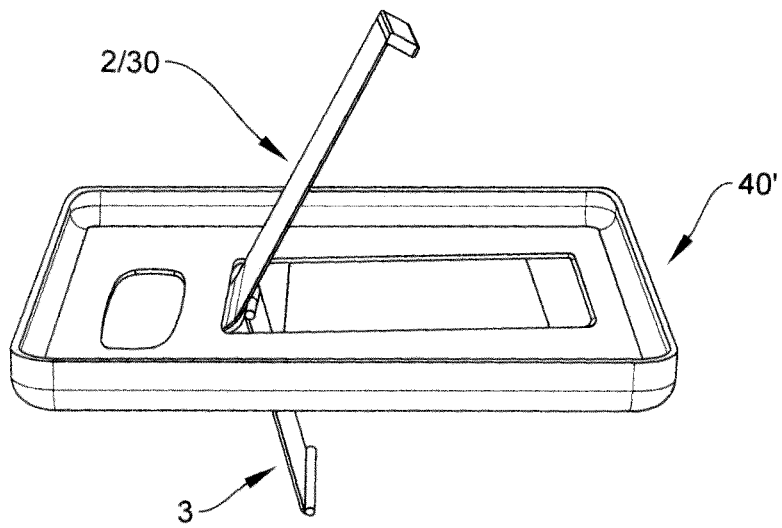
FIG. 32 is an alternate embodiment of the invention holder and cell phone case of FIG. 26, where, in a top perspective view, a combined bottom and spring plate is adapted to incorporate the structure and function of the spring plate and bottom plate and the cell phone case is provided with two openings to receive the combined bottom and spring plate.

FIG. 32 is an alternate embodiment of the invention holder and cell phone case of FIG. 26, where, in a top perspective view, a combined bottom and spring plate 2130 is adapted to incorporate the structure and function of the spring plate 30 and bottom plate 2 and the cell phone case 40' is provided with two openings to receive the combined bottom and spring plate.

Figure 33:
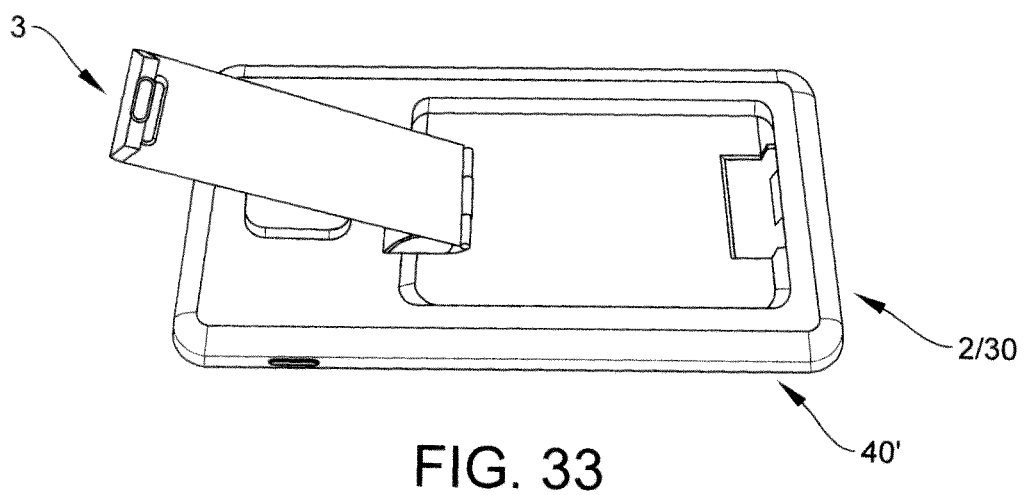
FIG. 33 shows the assembly of the holder of FIG. 32 with the combined bottom and spring plate fixed in the openings of the cell phone case.

FIG. 33 shows the assembly of the holder of FIG. 32 with the combined bottom and spring plate 2/30 fixed in the openings of the cell phone case 40'. This embodiment also comprises a complementary piece similar to insert 45 of FIG. 29 which adapted to cover the openings in case 40' when the invention holder shown in FIG. 33 is taken apart from case 40'.

Figure 34:
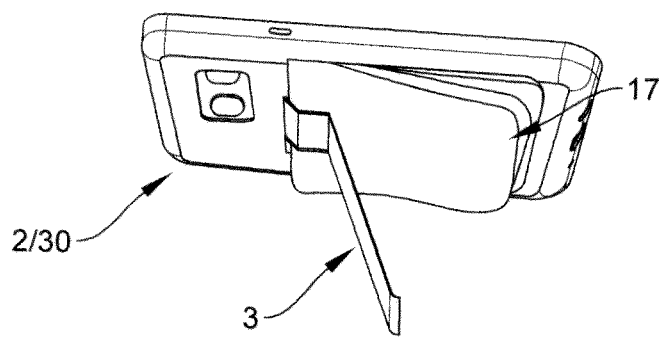
FIG. 34 shows the embodiment of the holder of FIG. 32 in rear perspective view with that holder engaged with the cell phone case and retaining bills and credit cards with the latch plate unlatched to provide support similar to that of the extendable plate of FIG. 30.

FIG. 34 shows the embodiment of the holder of FIG. 32 in rear perspective view with that holder engaged with the cell phone case 40' and retaining bills and credit cards 17 with the latch plate 3 unlatched to provide support similar to that of the extendable plate of FIG. 30.

Figures 35, 36:
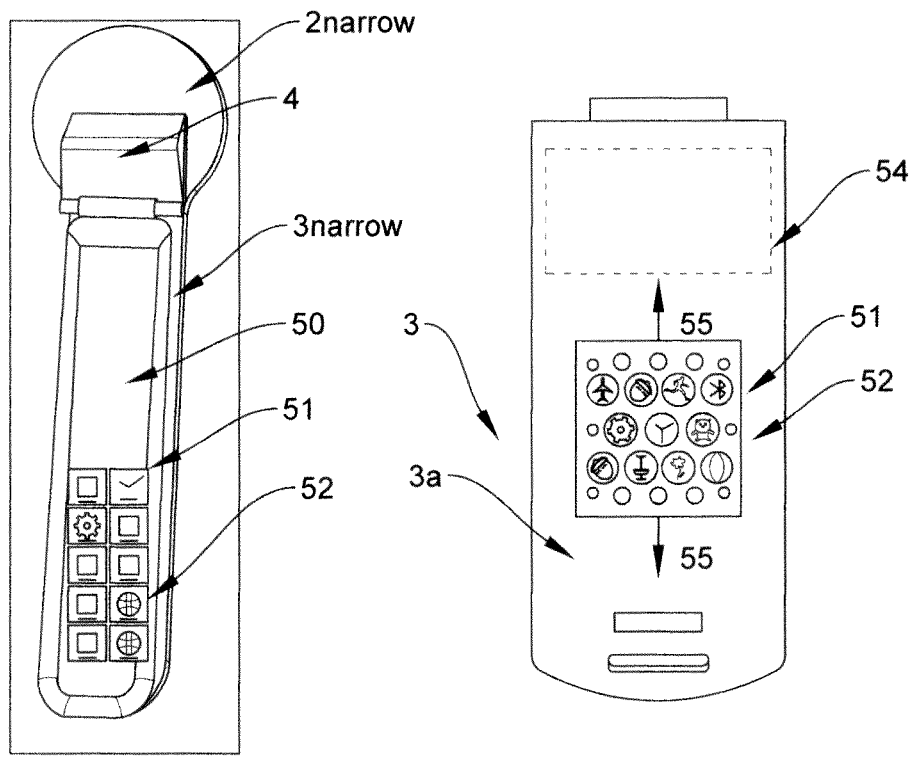
FIG. 35 is a top view of an narrow embodiment of the invention holder having embedded in its latch plate a housing supporting the visible touch screen display, which housing and touch screen display are electrically connected to circuits and a microprocessor in the housing to comprise the functions of a typical smart watch, which is operable by itself or in wireless communication with a cell phone.
FIG. 36 is a top view of the latch plate of FIG. 1 separated from the invention holder only for purposes of showing that the smart watch of FIG. 35 may also be incorporated into all the forms of the latch plate of the invention holder.

FIG. 35 is a top view of an narrow embodiment of the invention holder, having a narrow bottom plate 2 narrow and a narrow latch plate 3 narrow having embedded in its latch plate a housing supporting the visible touch screen display 52, which housing and touch screen display are electrically connected to circuits and a microprocessor in the housing to comprise the functions of a typical smart watch, which is operable by itself or in wireless communication with a cell phone.

FIG. 36 is a top view of the latch plate of FIG. 1 separated from the invention holder only for purposes of showing that the smart watch of FIG. 35 may also be incorporated into all the forms of the latch plate of the invention holder, but that display 52 can be increased in size in directions 55 and protected from contact with spring means 4 in section 54 by way of a spacer post or flange so the display 52 does not contact spring means 4.

Figure 37:
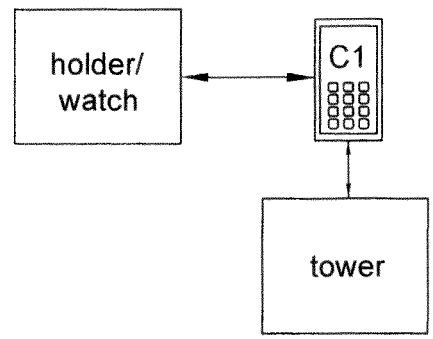
FIG. 37 is a diagram of the invention holders of FIGS. 35 and 36 in wireless communication with a cell phone, which is wireless communication with a cell tower.

FIG. 37 is a diagram of the invention holders of FIGS. 35 and 36 as holder/watch in wireless communication with a cell phone C1, which is wireless communication with a cell tower.

Figure 38:
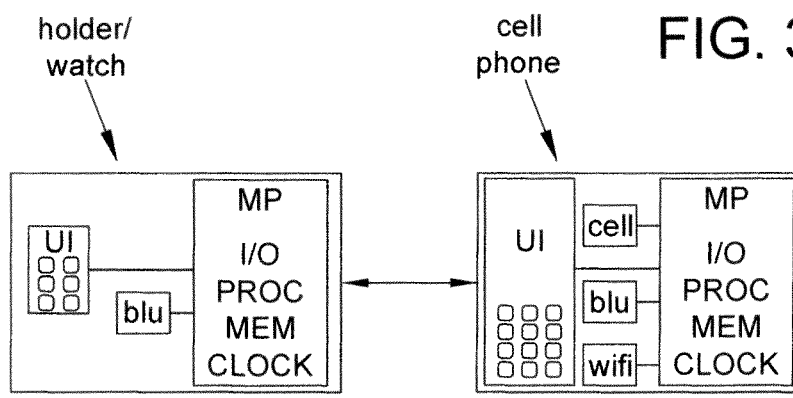
FIG. 38 is a high-level diagram of the holder/watch embodiments of FIGS. 35-37 in wireless communication with a cell phone.

FIG. 38 is a high-level diagram of the holder/watch embodiments of FIGS. 35-37 in wireless communication with a cell phone. The cell phone comprises a standard touch screen or similar display and pressure sensitive button interface operating under a control program of the microprocessor MP and having means for wireless communication by cellular, WiFi, and Bluetooth standards.

The holder/watch comprises similar operating under a control program of the microprocessor MP and having means for wireless communication by Bluetooth {or other appropriate) standard with the cell phone. The holder/watch may operate independently {free from communications with the cell phone) or dependently (in communication with the cell phone) to perform all functions of current smart watches, such as notification by sound or vibration of receipt of emails or messages or alarms that occur at the cell phone, tracking of GPS coordinates for fitness, display of data at the holder/watch of data transmitted from the cell phone, such as results of operation of software or apps on the cell phone.

Figure 39:
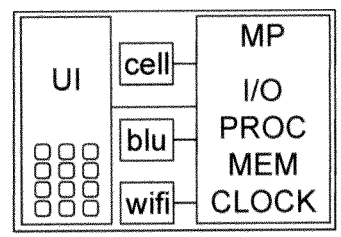
FIG. 39 is a high-level diagram of the holder embodiments of FIGS. 35-37 incorporating a cell phone into the latch plate.

FIG. 39 is a high-level diagram of the holder embodiments of FIGS. 35-37 incorporating a cell phone into the latch plate, where, instead of smart watch a cell phone is provided within the supporting housing described above.

Figure 40:
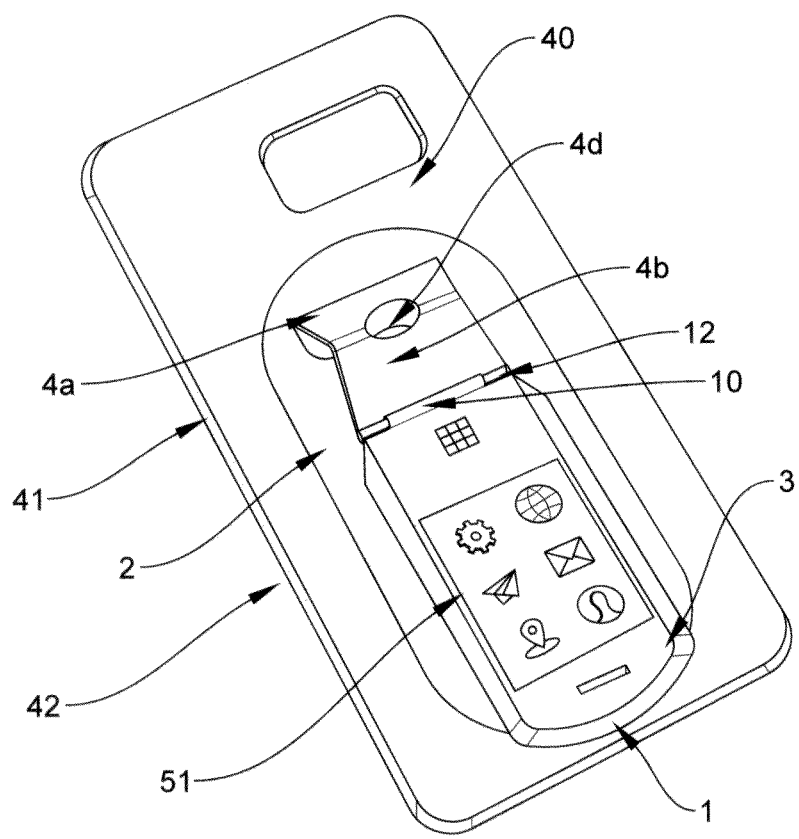
FIG. 40 is a rear perspective view of a rectangular cell phone case as in FIG. 24 further showing incorporation of the holder 1 into such a cell phone case.

FIG. 40 is a rear perspective view of a rectangular cell phone case as in FIG. 24 further showing incorporation of the holder 1 into such a cell phone case. The broken line outline shows a general surface area in which the form factor of the invention smart watch 51 can be incorporated into the invention holder. Power for cell phones is typically provided by a battery of substantial size relative to the form factor of the rest of the circuits, so that it will be preferred that a bottom plate of the invention holder is adapted to contain the powering battery for the cell phone (or smart watch embodiment) with appropriate wiring and electrical connection made between the latch plate and the bottom plate.

Incorporation of smart watch functionality into the invention holder of currency or credit cards is an improvement in some ways over wearing a watchband with a housing and touch screen to accomplish the same functions. A user need not endanger the sensitive components on a wrist and instead carry the holder/watch in their pocket with valuable credit cards and cash. The fitness aspect of the smart watch is more accurate, in that it does not record actions of the arm of a user, only actual full body movements.

It will be understood that the breadth of the invention concept of incorporation of a credit card holder or bill clip that extends outward from a surface of a support plate of a rectangular removable cell phone case is not limited by the specific description, i.e., any credit card or bill clip or holder with a substantial flat surface of a support plate supporting the clip or holder outward from that flat surface can be adapted using the present description to be fixed in a plate such as bottom plate 2 or otherwise glued or fixed to the backside of a cell phone case as described herein.

It will be further understood that the breadth of the invention concept of incorporation of smart watch with the invention holder extends to any card holder or bill clip that extends outward from a surface of a support plate and adapting said support plate to sufficient width and structural depth to secure in said support plate a housing and circuits of a touch screen smart watch. For instance, said smart watch can be incorporated into bottom plate 2 or into latch plate 3 by way of the above description.

The above described prior art clips may be adapted to incorporate a smart watch by way of the present description as well, by way of thickening support plates from which extends clips or similar structural features to capture credit cards or bills.

Figure 41:
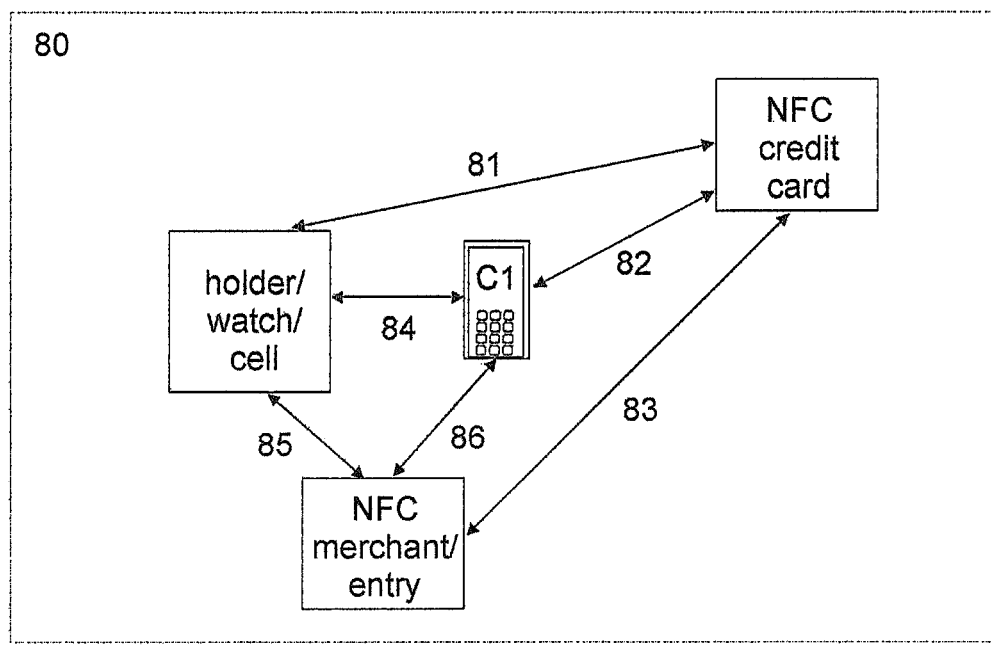
FIG. 41 is a high-level diagram of a credit card or bill holder of any construction incorporating the microprocessor devices of FIGS. 35-39 and communicating wirelessly directly or indirectly with a near field communication enabled credit card or where said near field near field communication enabled credit card secured in said holder wirelessly communicates with a cell phone.

FIG. 41 is a high-level diagram of a security system 80 having additional and virtually un-hackable levels of security for transactions conducted involving a near field communication enabled credit card NFC credit card and a wireless communication between the NFC credit card and an near field communication enabled authorization device NFC merchant/entry. The following is a description of the relevant technology to the security system 80.

Near field communication (NFC) devices provide easily transportable access to payment for and/or provider-delivery of goods and services by way of secure integrated circuits (or their functional equivalent) incorporated into handheld items, some as small as paper tickets, brought into close proximity of a NFC reader device. In cases, advanced security against mis-use of NFC devices and readers may be available. Security in digital systems may balance hardware requirements, computing power, memory, and permissible time required for computation of access, transmissions, and security algorithms. In some cases, time is a critical limitation for a security system controlling consumer purchases. For example, consumers may be intolerant of time delays in making purchases or obtaining goods or services by way of digitally secure transactions.

Portable and handheld computing devices may include substantial processing capabilities and where combined with near field communication capabilities for concluding local transactions they provide important additions to consumer methods of purchasing. Such devices may include mobile communications devices enabled with near field communication (NFC) capability for making financial transactions and transacting sales at POS terminals of transaction offering entities (such as mobile cellular telephones, WiFi enabled data devices, such as the iTouch, iPhone and iPad), mobile computer tablets, and laptop computers enabled for cellular communication) (referred to herein as Enabled Devices).

Enabled Devices may have a microprocessor comprising a CPU, memory, and input/output circuits operating under a control program or programs for effective connections to wireless communication components and a local user interface to accomplish wireless communications between an Enabled Device and a remote correspondent.

A remote correspondent may be a wireless communications device across a table from a user of an Enabled Device in a direct peer to peer communication session. A remote correspondent may also be a credit card server system across the globe from a user of an Enabled Device, where the Enabled Device wirelessly communicates with a cellular communication tower or link and thereafter is routed to an Internet connection to the credit card server system for an indirect communication session.

Further, a remote correspondent may be a local sales processing computer server system in a store where a user of an Enabled Device directly wirelessly communicates with a local NFC reader, which in turn in linked with a sales processing sales computer system of the merchant store. As used herein, a remote correspondent comprises any of those recipients or transmitters of voice or data that are capable of communicating directly or indirectly with an Enabled Device. These specific examples of remote correspondents are not intended to be limiting as to the definition of a remote correspondent.

NFC user smartcard architecture combines coprocessors for security protocols RSA, ECC, DES and AES and enables implementation of operating systems including Java Open Platform and MULTOS. However, functions carried out by processor circuits of an NFC user card can be incorporated into processor circuits of appropriately modified or more capable computer chips and processors.

While many advanced security and encryption methods are available in the art, those security methods which meet the requirements of NFC device and readers actually used are limited by well-known industry standards and handheld device capabilities and structures. Presently, a further limitation of handheld devices may occur where an NFC communication includes use of a mobile or wireless communication device (including, without limitation, a cellular phone or WiFi enabled handheld device).

As described in U.S. Patent Application Publication 2010/0205432 (Title: METHOD, SYSTEM, TRUSTED SERVICE MANAGER, SERVICE PROVIDER AND MEMORY ELEMENT FOR MANAGING ACCESS RIGHTS FOR TRUSTED APPLICATIONS; Ser. No. 12/679,874; Filed: Sep. 20, 2008), which is incorporated herein by reference, "Mobile NFC" combines a secure NFC user card or its equivalent and a mobile telephone or similar handheld device. This provides long range wireless communication of NFC voice or data.

NFC user card functionality can be incorporated into a mobile telephone by way of the UICC (Universal Integrated Circuit Card), a removable integrated circuit or card used in mobile phones in GSM, UMTS and similar networks. Such a device must be NFC capable, such as supporting SWP (single wire protocol), to use UICC which provides storage of credit card credentials.

We turn now to a description of the invention security system 80. The remote correspondent of the above corresponds to the NFC merchant/entry aspect of FIG. 41. It should be noted that NFC security is weak where the interception of wireless signals between the NFC credit card and the NFC merchant/entry allow for mis-use by an intercepting device/user.

Mitigating this weakness, embodiments of applicant's system provide an additional level of confirmation security to the wireless transactions. This confirmation security cannot be duplicated by an intercepting device/user.

In the security system 80, NFC merchant/entry device alerts by wireless signals either the (i) invention holder (which in FIG. 40 may be any type of credit card or bill holder or clip with a support plate expanded to incorporate the appropriate microprocessor/interface/NFC enabled device), (ii) the cell phone C1, or (iii) the NFC credit card of its presence and, after appropriate "handshake" signals, requires authorization from one of these before proceeding with authorization of a transaction or entry.

In the invention security system 80, one of several combinations of communications among the devices of FIG. 41 occurs: (1) authorization is required from the NFC credit card and one of either the invention holder or the cell phone C1 according to authorizations required for NFC transactions; (2) authorization is required by the NFC merchant/entry device directly from either the invention holder (which in FIG. 40 may be any type of credit card or bill holder or clip with a support plate expanded to incorporate the appropriate microprocessor/interface/NFC enabled device) or cell phone C1, one of which must obtain a typical NFC authorization wirelessly and directly from the NFC credit card before transmitting an authorization code to the NFC merchant/entry device; or (3) authorization is required by the NFC merchant/entry device directly from either the NFC credit card which must obtain a typical NFC authorization wirelessly and directly from the invention holder (which in FIG. 40 may be any type of credit card or bill holder or clip with a support plate expanded to incorporate the appropriate microprocessor and interface) or cell phone C1.

In any of these three security system embodiments, mere duplication of the communicated authorization signal to the NFC merchant/entry device cannot accomplish the transaction. Only interactive communication with (i) the invention holder, which holds the NFC credit card, or (ii) the cell phone C1 and the NFC credit card can accomplish the transaction. This is because the authorization required by the NFC merchant/entry device is a two step authorization depends upon (1) an NFC credit card code and (2) one of an (i) invention holder or (ii) cell phone code.

Security system 80 allows for concluding a sale or for authorized entry into a secure building, said card or bill holder of any construction incorporating the microprocessor devices of FIGS. 35-39 and communicating wirelessly directly or indirectly with a near field communication enabled credit card or where said near field near field communication enabled credit card secured in said holder wirelessly communicates with a cell phone.

Turning now to embodiments of the currency and credit card holder with alternate latch plates or upper jaws, reference is made to FIGS. 42-45.

Similar to the latch plates/upper jaws described above, FIG. 42 shows a rectangular upper jaw 300 in plan 331 and profile 332 views. However, this upper jaw includes a pocket or depressed area 302 in its surface 304. The pocket 302 is for receiving a battery, NFC chip, storage device, or the like 320.

FIG. 43 shows the upper jaw 300 of FIG. 42 which accommodates the battery and/or an NFC chip 320 in the pocket 302. The battery and/or NFC chip may be removable. The upper jaw is mounted to a spring plate or lower jaw 350 that is similar to the spring plates described above. In various embodiments the lower jaw is rectangular and/or substantially flat.

FIGS. 43-44 show one end of a "V" shaped spring 341 is anchored to the lower jaw 350 near an end of the lower jaw 354. The other end of the spring includes a hinge part 316 (see FIG. 44) that is biased toward the lower jaw 350. Hinge 312 includes parts 314 and 316 (see FIG. 44) and hinge part 316 rotatably connects with mating hinge part 314 at one end of the upper jaw 300. For example, a pinned hinge may be used where a pin (not shown) is inserted through hinge parts 314 and 316 to rotatably fix the upper jaw to the lower jaw.

In FIG. 44 the upper jaw 300 is shown above the lower jaw 350 before the hinge parts 314, 316 are mated. This view illustrates the location of a power cable such as a ribbon cable 310 which conducts electric power from the battery 320 within the pocket 302 of the upper jaw 300 to a cell phone or other appliance 330 mounted on a side of the lower jaw 350 opposite the spring 307.

The power cable 310 may take various routes between the battery and the cell phone and along these routes may traverse the interior or exterior of the spring 321. For example, the power cable may be routed from the battery 320, through a pocket end wall 319, and around hinge parts 314, 316. The cable may continue along an interior surface of the spring 321 and through a lower jaw hole such as a hole beneath the spring 323. And, the power cable may end at a power connection of the cell phone 325.

Figure 45:
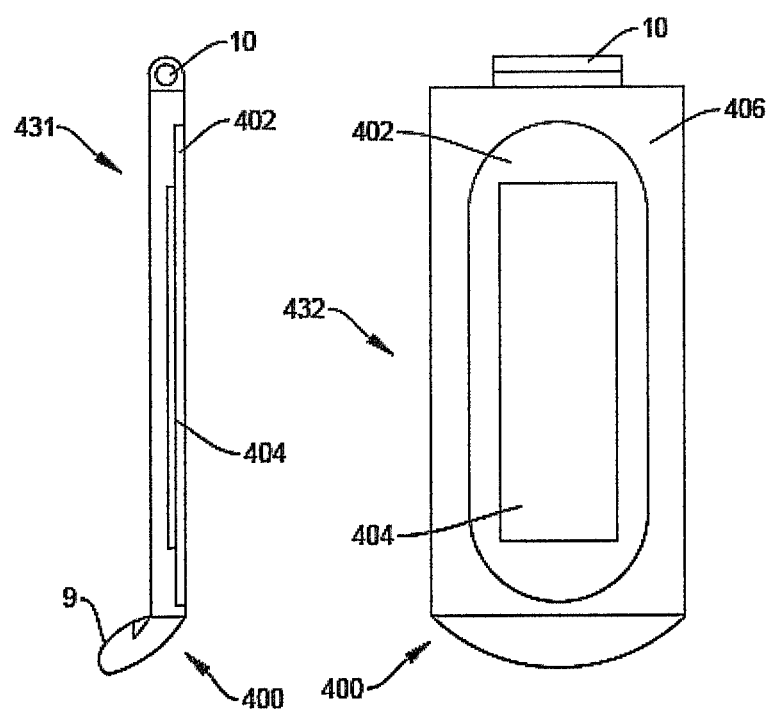
FIG. 45 shows a lever adapted to hold an NFC or Bluetooth device.

In FIG. 45, yet another upper jaw design is similar to the upper jaws described above. As seen, a rectangular upper jaw 400 in presented in plan 431 and profile 432 views. However, this upper jaw includes nested pockets or depressed areas 402, 404 in its surface 406. As shown, pocket 404 is the deepest pocket. Pocket 404 is for receiving an NFC chip and pocket 402 is for receiving an insert or cover such as a natural or manmade fabric, hide, mat, or means of advertising or personalization such as a logo or personalization plate (not shown).

We turn now to variants of a lever wallet that include biometric functionality. In particular, a lever wallet having a biometric input and/or a means for contactless communications with a device such as a point of sale terminal is disclosed.

Figure 46:
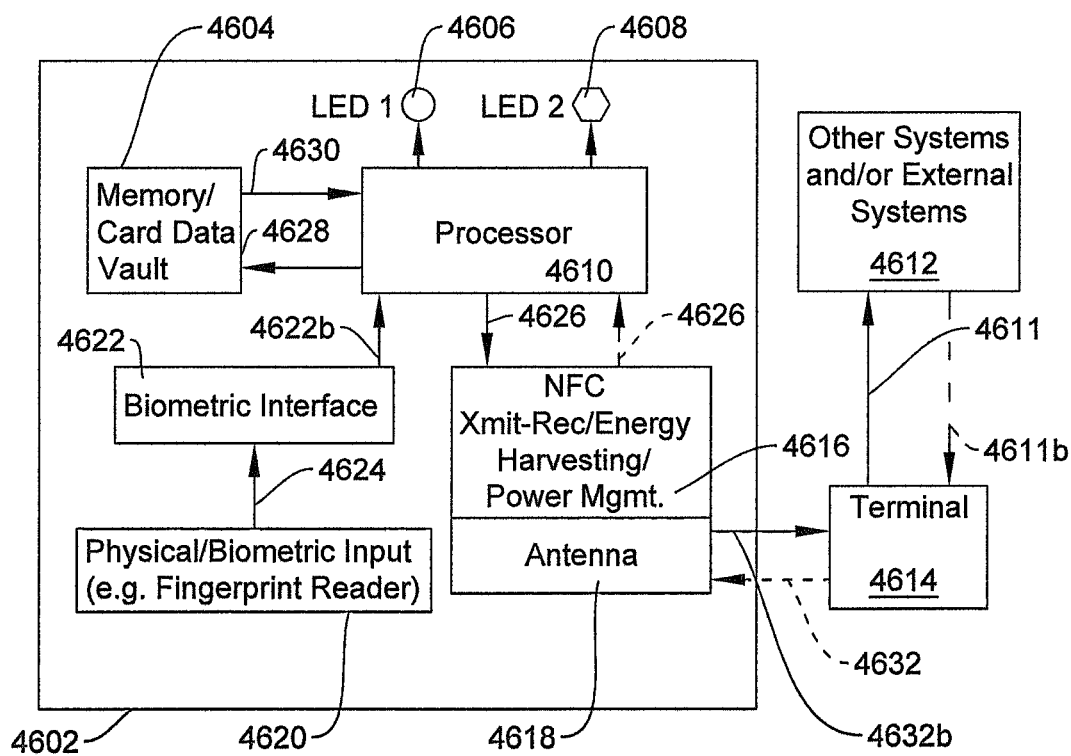
FIG. 46 shows a block diagram of components and functions included in a biometric lever wallet.

FIG. 46 shows components and functions of a wallet lever 4602 that includes biometric functionality. In general, a biometric input 4620 and an antenna 4618 provide for contactless communications with a terminal 4614 in order to verify that the wallet user is authorized to complete the transaction offered by the terminal.

Wallet lever components include a processor 4610 coupled to a biometric input such as a fingerprint reader 4620. A biometric interface 4622 with an output to a processor 4622b may be used between the biometric input and the processor 4620. The interface may include amplifier(s), comparator(s), and/or signal conditioning components. Fingerprint readers or scanners include capacitive devices, optical devices, thermal devices, and ultrasonic devices. A processor is also coupled to a memory device 4604.

Communications 4632 from the terminal 4614 to the wallet lever 4602 may include a terminal's request for a particular credit card or a preferred card as where a store card is involved. Communications 4632b from the wallet lever to the terminal 4614 may include information required for the granting of rights such as the information verifying identity of the wallet user.

Communications from the wallet lever to the terminal typically include transmission of a credit card number after verification that the wallet lever user is authorized to use the card.

Communications from the wallet lever to the terminal typically are preceded by placing a finger on the fingerprint scanner 4620 resulting in fingerprint signals 4624 being sent to the processor 4610. At this point, an authorized user fingerprint file stored 4628 in memory 4604 may be retrieved 4630 and compared with the scanned fingerprint. If there is a match, the processor grants a fingerprint permissive which we will refer to as the grant of a first token.

Two factor authentication may include use of a second token. The second token may be granted based on a code entered into the terminal 4614 or based on yet another biometric comparison.

If the first token is granted in one factor authentication, the processor 4610 sends a credit card number or the like to the terminal 4614. If the first and second tokens are granted in two factor authentication, the processor 4610 sends a credit card number or the like to the terminal.

In some embodiments, the credit card number reaches the terminal 4614 after being transmitted wirelessly. For example, the processor 4610 may pass the credit card number 4626 to an NFC transmitter 4616 and an antenna 4618 may receive the NFC transmitter output. In this manner, the credit card number may be transmitted to the terminal 4614 and the terminal may relay the information to other systems or external systems 4612 to complete the transaction. Information leaving the terminal 4614 may be transferred 4611 to external systems. External system information may also be sent 4611b to the terminal 4614. In some embodiments, the processor 4610 may receive 4626b information such as fingerprint templates, for example from external systems 4612.

One or more colored LED indicators or multicolored LED indicators 4606, 4608 may be located on the lever. LED(s) colors advise the user of transaction status and/or lever operation and in general may be used to show states precedent to transmission of a credit card number to the terminal 4614 and whether a card number is successfully transmitted to the terminal 4614. In an embodiment, a color such as yellow indicates a fingerprint has been acquired by the reader 4620, and/or a color such as green indicates that the fingerprint matches the fingerprint filed in memory 4604, and/or a color such as green or blinking green indicates that the credit card number has been transmitted to the terminal 4614, and/or a color such as red indicates that the credit card number will not be transmitted to the terminal 4614.

Other functions of the wallet lever may include energy harvesting and/or battery or removable battery powering with subsequent management and distribution of electric power to wallet lever electronics. The NFC Transmit/Receive/Energy Harvesting/Power Management device 4616 may accomplish these functions. In particular, energy the wallet lever receives via antenna 4618 communications with the terminal 4614 results in usable electrical power that is harvested and managed 4616 for the benefit of wallet electronics including any of memory 4604, LED 1 4606, LED 2 4608, processor 4610, NFC transmit receive/energy harvesting/power management and biometric interface 4622 in the wallet lever.

Figure 47A:
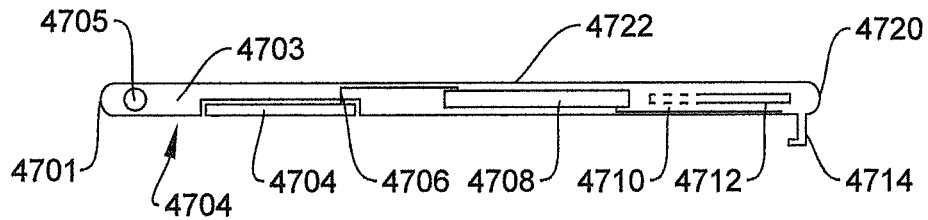
FIG. 47A shows a biometric lever for use with a biometric lever wallet.

FIG. 47A shows a wallet lever 4702. In various embodiments the wallet lever 4702 includes a hinge, hinge point, or pivot point 4705 at a first end 4701 and a catch or latch 4714 at the opposite end 4720. Between these ends, is a fingerprint reader 4704 near the first end 4701 and an antenna 4712 near the opposite end or near the top of the opposite end. Electronics 4708 including any or all of the electronics mentioned in connection with FIG. 46 may be located near a center 4722 of the wallet lever. An electrical connection 4706 exists between the fingerprint reader and the electronics package and an electrical connection 4710 exists between the electronics package and the antenna.

It should be noted that biometric devices other than fingerprint scanners may be used with the inventive wallet. For example, a palm scanner may be included in a base (e.g. FIG. 47D, item 4742) of the wallet (e.g. FIG. 47D items 4702 and 4742). For example, an iris scanner may be included for example on the bottom of the lever (FIG. 47C). For example, an imaging device for facial recognition may be included for example on the bottom of the lever. For example, voice recognition may be included with a microphone placed anywhere on the wallet.

The lever frame 4703 may be made from a material that is not an electrical conductor. The lever frame 4703 may be made from or include plastic. The electrical parts may be embedded in a plastic frame.

The lever frame 4703 may be made from or include an electrical conductor such as steel. The lever may include a material of high permeability. For example, where the wallet lever includes steel frame parts, high permeability sheets may be located between the antenna and steel frame parts to lessen the ground plane (detrimental) effects of the steel frame parts.

Where the spring 4744 is a part of a metallic strip that extends throughout the length of the base or a substantial portion thereof (not shown), it may act as a ground plane beneath the antenna 4712 when the wallet lever 4702 is closed against the base 4742. While this ground plane is detrimental to radio frequency communications, it is noted that as shown in FIG. 47E, wireless wallet communications with a terminal 4770 typically occur when the wallet lever is rotated away from the base and therefore when the wallet lever antenna is moved away from the base and out of proximity with the wallet lever antenna.

Figure 47B:
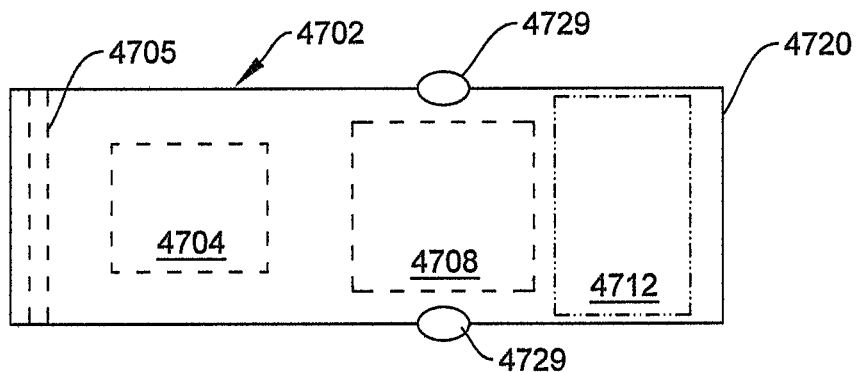
FIGS. 47B-C show top and bottom views of the lever of FIG. 47A.
Figure 47C:
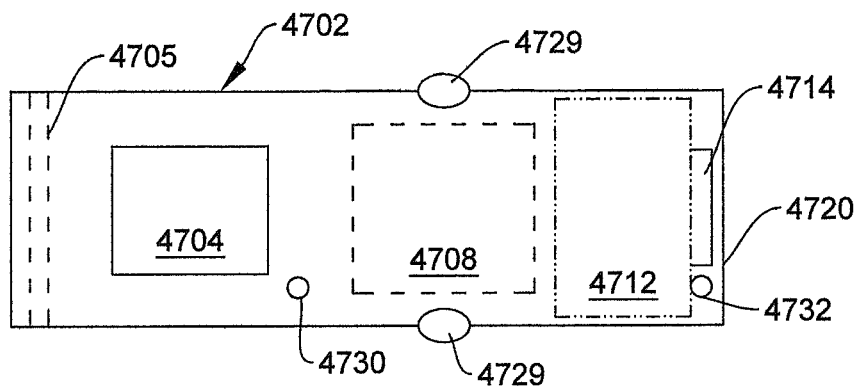

FIG. 47B shows a top view of the lever 4702 that is visible when the lever is closed against a lever base (e.g., item 2 in FIG. 3). In this view, the fingerprint reader 4704 is shown in dashed lines as are the electronics 4708 and the antenna 4712. The dashed lines indicate placement of components below the upper surface of the wallet lever when the wallet lever is viewed from the top. As such these components are not visible from the top of the wallet lever.

Notably, the antenna 4712 is shown adjacent to the opposite end 4720 of the lever. Advantages of this arrangement include limited antenna effectiveness and as such limited range making it difficult for electronic eavesdropping. Advantages of this arrangement place the antenna at the end of the wallet lever that is placed over the terminal 4614 (for example, see FIG. 47E).

In various embodiments the antenna 4712 may be a wire embedded in the wallet lever frame 4703 and the extent of the antenna may be limited as shown or it may, for example, follow more closely the perimeter of the wallet lever and so be larger in footprint. In various embodiments, the antenna may be coiled traces on a printed circuit board. In some embodiments, the antenna is designed with an inductance of about 1 microhenry or more for use as an NFC antenna.

The lever wallet may be opened with one hand. The benefit is that the wallet may be held and "opened" with only one hand. For example, the thumb of the hand holding the lever wallet may be placed on the lever end 4720 to lift the end away from the base 4702. In another embodiment, a projection, indented portion, or raised portion of the sides of one or more frames 4729 may provide a thumb hold for lifting the lever 4729 (e.g., see lever base 4742) away from the lever base using the same hand that holds the device (e.g., see wallet device 4760). As is typical of the features described herein, this wallet lever lifting feature may be used on any of the wallet levers disclosed herein.

FIG. 47C shows a bottom view of the lever 4702 that is accessible when the lever is pivoted away from the base as shown in FIG. 6. In this view, the fingerprint reader 4704 is visible such that a finger such as a thumb can be placed on the reader. However, because they are fully embedded, the electronics 4708 and the antenna 4712 are again not visible from the bottom of the wallet lever.

In addition, FIG. 47C shows the latch which is visible from the bottom of the wallet lever as are LED(s). In particular, LED(s) 4730, 4732 (see also 4606, 4608) may be located on the lower wallet lever surface adjacent to the fingerprint reader 4730, adjacent to the opposite end 4720, or in another location visible to the wallet user when the user's finger covers the fingerprint reader.

Figure 47D:
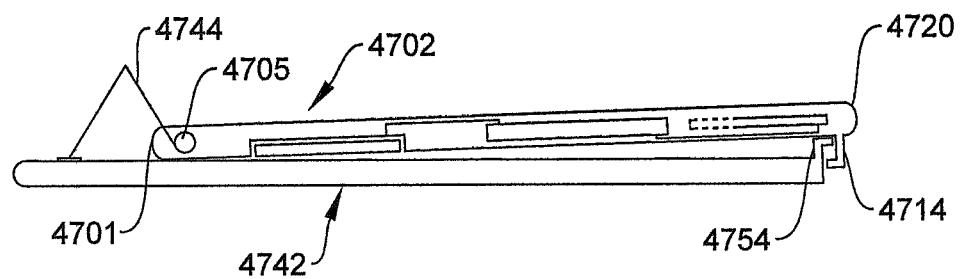
FIG. 47D shows a biometric lever similar to that of FIG. 47A mounted on a base.
Figure 47E:
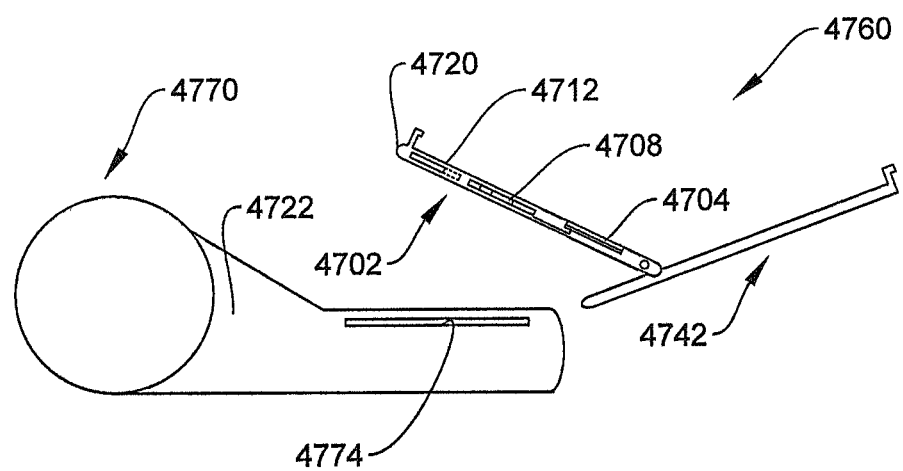
FIG. 47E shows a biometric lever wallet in communication with a terminal.

FIG. 47D shows an assembled wallet lever 4702 and wallet base 4742. At the first end 4701, the wallet lever is biased against the wallet base by a spring 4744. At the second end 4720, a wallet lever latch part 4714 engages a wallet base latch part 4754 such that motion of the wallet lever with respect to the wallet base is limited. Notably, in some embodiments the second end of the wallet 4720 extends beyond the wallet base by about 0.25 to 0.75 inches to allow for a finger hold that enables separation of the latch parts 4754, 4714 and lifting of the wallet lever 4702 away from the wallet base 4742.

It is also noted that the fingerprint scanner 4704 location at the bottom of the wallet lever 4702 provides protection from damage. In particular, when the wallet lever is closed near or against the base 4742, the fingerprint scanner/sensor is protected by items held under the spring 4744 and/or by the base.

FIG. 47E shows a wallet 4760 and terminal 4770. The wallet includes a wallet lever 4702, wallet base 4742, antenna 4712, electronics 4708, and fingerprint reader 4704. The terminal includes a body 4722 and mounted within the body an antenna 4774. As shown, the wallet lever is moved away from the base such that the wallet is "opened." By placing the opposite end of the wallet lever and thus the wallet antenna 4712 above the terminal 4770 and its antenna 4774, the close proximity of the antennas 4774, 4712 provides good electromagnetic coupling and thus good communication.

Figure 48A:
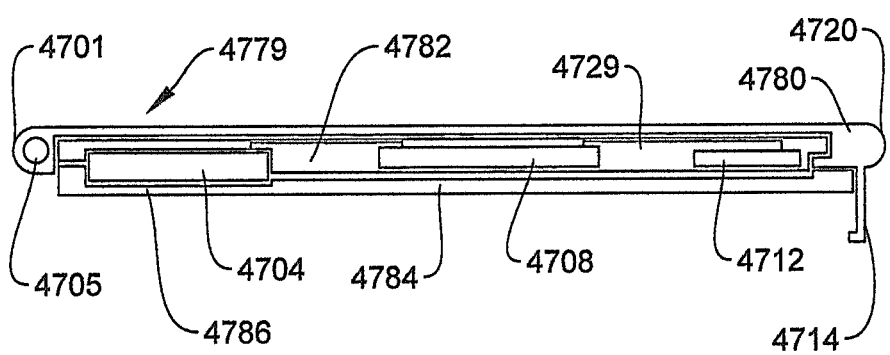
FIG. 48A shows a biometric lever comprising three layers.

FIG. 48A shows another example of a wallet lever 4779. In this example, a middle layer or middle frame 4782 is between a top layer or top frame 4780 and a bottom layer or bottom frame 4784.

Figure 48B:
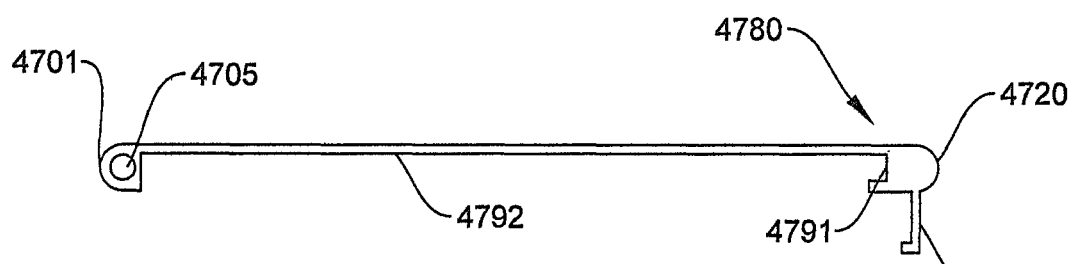
FIG. 48B shows a top layer of the biometric lever of FIG. 48A.

FIG. 48B shows the top frame which includes the pivot point or connection 4705 at a first end 4701 and a latch part 4714 at the opposite end 4720. The frame provides a cavity 4792 for receiving the middle frame 4782 and a pocket 4791 for receiving and fixing a tang 4793 of the middle frame. In various embodiments the top frame may be made from appropriate ones of the materials mentioned in connection with FIG. 47 above. In various embodiments the frame can be made of materials including electrical conductors or electrical non-conductors, plastic(s), metals, and the like. In an embodiment, the frame is substantially made from plastic.

Figure 48C:
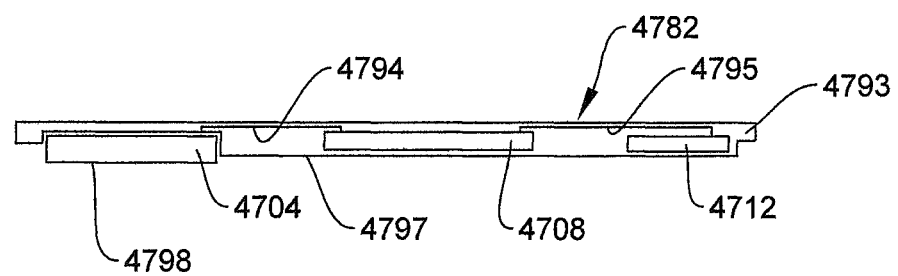
FIG. 48C shows a middle layer of the biometric lever of FIG. 48A.

FIG. 48C shows the middle frame which carries components including the fingerprint reader 4704 which may include a fingerprint scanner bezel, the electronics package(s) 4708, and the antenna 4712. An electrical connection joins the fingerprint reader and electronics package(s) 4794 and an electrical connection joins the electronics package(s) and the antenna 4795. As seen, the fingerprint reader may protrudes from the frame 4798 and provide a free surface that is accessible through a window 4786 in the bottom frame. In various embodiments the middle frame may be made from appropriate ones of the materials mentioned in connection with FIG. 47 above. In various embodiments the frame can be made of materials including electrical conductors or electrical non-conductors, plastic(s), metals, and the like. In an embodiment, the frame is substantially made from plastic.

Figure 48D:
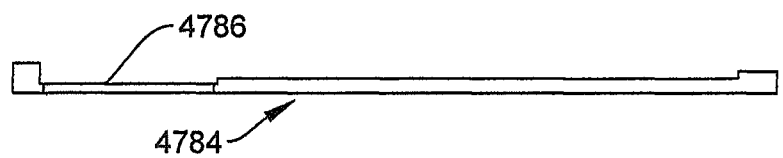
FIG. 48D shows the bottom layer of a biometric lever of FIG. 48A.

FIG. 48D shows the bottom frame 4784 which covers the bottom 4797 of the middle frame 4782 and provides a penetration or window 4786 for exposing a surface 4798 of the fingerprint reader 4704. When assembled, the top frame 4780 and bottom frame may be fixed together by joining the materials of each, with an adhesive material, or with fasteners such as screws. Alternatively, the frames 4780, 4782, 4784 may be joined in pairs or in any order using appropriate methods including any of the methods described above.

As shown, the fingerprint scanner 4704 is accessible through a window or bezel 4786 in the bottom frame 4784. The bezel or window may be proud/extend beyond the fingerprint sensor and/or the fingerprint sensor may be recessed in the bezel or window such that a finger pocket exists to assist in positioning a finger on the fingerprint scanner.

While the above contemplates use of the lever wallet in a financial transaction, the lever wallet may also be used to gain assess to things or places where access is controlled. Things or places where access is controlled. may include metros, airports, facilities, secure facilities, government facilities, detention facilities, commercial establishments, homes, stores of valuable items and the like.

Described below are wallet versions including the Essential Wallet, Premium Wallet, and Ultimate Wallet. Any of these wallets may include one or more of the features described in connection with the biometric wallets above.

We now turn to other versions of the biometric wallet. They are 1) the Essential Wallet, 2) the Premium Wallet, and 3) the Ultimate Wallet.

Essential Wallet

Figure 49A:
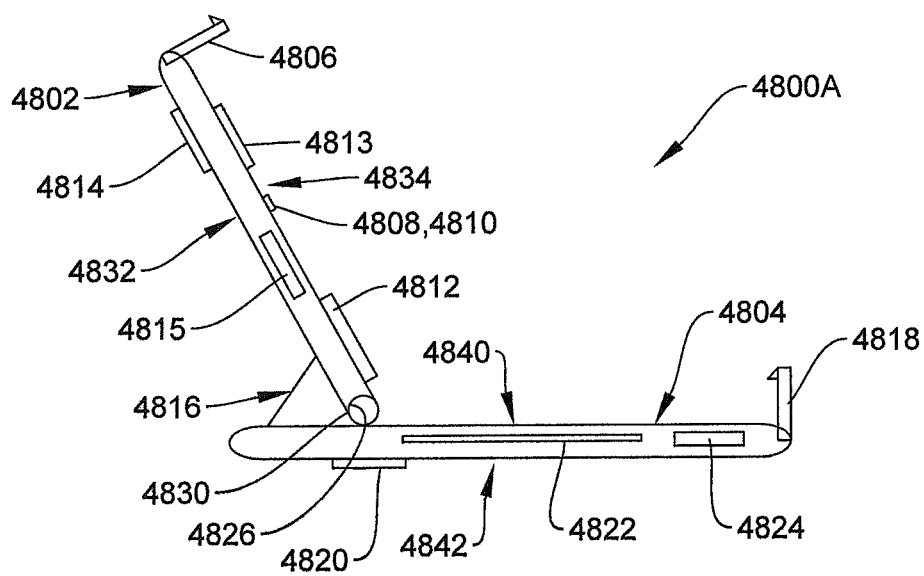
FIG. 49A shows an essential wallet incorporating a lever and a base.

FIG. 49A shows an embodiment of an essential wallet which may sometimes be referred to as a passive wallet 4800A. In the figure, a lever 4802 is articulated with respect to a base 4804 via a spring means 4816. The lever has lever latch 4806 for mating with a base latch 4818. This wallet may include one or more of the features or components described above.

Currency, credit cards, and the like can be placed between a lever foot 4826 and the base 4804 when a gap is opened between the foot and the base (see FIGS. 7-9). This gap may be opened by pivoting the lever away from the base such that the foot and a spring means end 4830 attached to the lever 4802 and/or foot are lifted away from the base. Once currency and/or cards are placed in the gap the lever may be pivoted back toward the base such that the latch 4806/4818 is engaged.

The lever 4802 includes an internal 4834 face intended to face the base 4804 and an external face 4832 opposite the internal face. Components and/or features visible on the internal face of the lever may include logo 1 4813, indicator lights (e.g. LED) 4808, 4810, and a fingerprint reader 4812. Components and/or features visible on the external face of the lever may include logo 2 4814. Logos may be those of credit services, bank services, payment services, suppliers of the wallet, or the like. For example, logos of one or more entities such as VISA, MASTERCARD, Bank of America, AMEX and other sponsor related entities may be presented.

Components and/or features integral with the lever may include electronics 1 4815. Electronics 1 may include any of the electronic devices mentioned above. Electronics 1 may include one or more of an on/off switch, antenna, EMV devices, micro control unit, secure element, power harvesting and reader. Electronics 1 may include one or more of memory, processor, biometric interface, LED lamp(s), NFC functions, remote enrollment functions including battery, antenna, and circuitry.

The base 4804 includes an internal face 4840 intended to face the lever 4802 and an external face 4842 opposite the internal face. Components and/or features at the internal face of the base may be found with the currency and/or credit cards within the wallet and may include an RFID blocker. Components and/or features at the external face of the base may include logo 3 4820 and/or an RFID blocker 4822. Components and/or features integral with the base may include electronics 2 4815, a battery 4824, and radio frequency (RFID) blocker 4822. Electronics 2 may include any of the electronic devices mentioned above. Electronics 2 may include one or more of an on/off switch, antenna, EMV devices, secure element, micro control unit, power harvesting and reader. Electronics 2 may include one or more of memory, processor, biometric interface, LED lamp(s), NFC functions, remote enrollment functions including battery, antenna, and circuitry.

RFID blocking technology may be used. RFID blocking reduces the readers transmitted signal power, preventing the microchip in the RFID card working which safeguards data. Contactless payment cards, ID cards, passports and the like may use this technology, In some embodiments, the RFID blocker is used to shield multiple cards preventing card clash, or to shield a single card and/or multiple cars such that it is the wallet that communicates with NFC machines and not the card(s). Because, in some embodiments, a typical RFID blocker has a range about 2-3 centimeters, opening the wallet lever can move a wallet antenna such as a wallet lever antenna out of range of the RFID blocker and allow wallet/NFC machine communications.

The essential wallet has two primary electronic functions. The first is receiving a copy of all or a part of card digital contents. The second is providing information for electronic transactions. Notably, as described above this wallet may obtain or harvest electric power from nearby devices such as transaction machines, for example an NFC machine.

In various embodiments, card copying begins with a user's receipt in the mail or otherwise of a EMV card or the like such as a contactless, contact, non-biometric card or biometric card.

In a first case, such as with a non-biometric card, use of the card may be authorized with a financial institution via phone or internet or the like. Then the wallet may receive and store card information. In addition, the card user's fingerprint may be stored in the wallet such that transactions made with the wallet require both the card information and the user's fingerprint. Notably, when the wallet is used with a transaction system such as one including an NFC device, the transaction system is informed by wallet operation that a biometric device is being used, allowing, for example, larger value transactions without a signature.

In a second case a biometric card may be subject to biometric enrollment which includes, for example one or more of, remote enrollment using a battery to power the card, enrollment of the card at an NFC machine, or enrollment of the card at a financial or other institution.

With remote enrollment, this card may be associated with a sleeve, other accessory, or within the wallet to provide battery power to the card either wirelessly or via electrical contacts. For example, sliding the card with respect to a sleeve may activate a circuit/path between the battery and the card such that the card is powered by the battery. For example, where the battery is in the wallet, it may be activated by wallet motion such as opening the lever. In some embodiments, the battery is intended to function for a few hours or days.

In various embodiments, once the card is powered, a user fingerprint is captured by a fingerprint reader on the card. At this point, a unique fingerprint is linked with a number or unique number associated with the card. For example, the card may be numbered and that number may be linked with the user's fingerprint.

Card transactions such as transactions requiring the card number may be subject to a biometric verification. For example, biometric verification that the associated fingerprint is reproduced on the cards fingerprint reader at the time of the transaction may be required before the transaction is allowed. Tokenization may be used.

Where the card must be authorized before transactions are allowed, the card recipient may be required to report receipt of the card via a phone call or another means. The authorizing entity may use the caller's telephone number or information provided by the caller to verify that the caller is authorized to use the card. Authorization may entail a change to the programming of an electronic system that vets card transactions. This change in programming typically makes transactions permissible, but does not permit transactions. Transactions are permitted only when biometric verification occurs at the time of the transaction.

Once a biometric identity is loaded into the card and the card is authorized for use, it may be copied into the electronic system of the wallet such that the wallet can be used for card transactions without the card.

In a card copying step such as a first card copying step, the card identification such as a card number is read by the wallet electronics when the card communicates with the wallet. A wallet light may flash or flash in color to indicate this step. This communication may be spontaneous depending on card/wallet proximity or it may be initiated by a signal from either the card or the wallet. The signal may be initiated by the user. For example, a biometric signal such as a fingerprint or a voice command may initiate the transfer of card information to the wallet. Having loaded the card information, the wallet may now awaits fingerprint recording. A wallet light may flash or flash in color to indicate this step is next. When indicated, the user presses the same finger as was used on the card onto the wallet fingerprint reader and the wallet stores this fingerprint information for use in transactions where the card number and a matching fingerprint are required.

Having completed the card copying process, the wallet is now capable of completing transactions that require the card number and a matching fingerprint. For example, a transaction may be completed merely by placing the wallet proximate an NFC device and opening the lever to initiate communications while placing a fingerprint finger on the wallet fingerprint reader. Note that it may not be necessary to remove the payment card from the wallet or even to have the payment card in the wallet to complete the transaction.

Premium Wallet

Figure 49B:
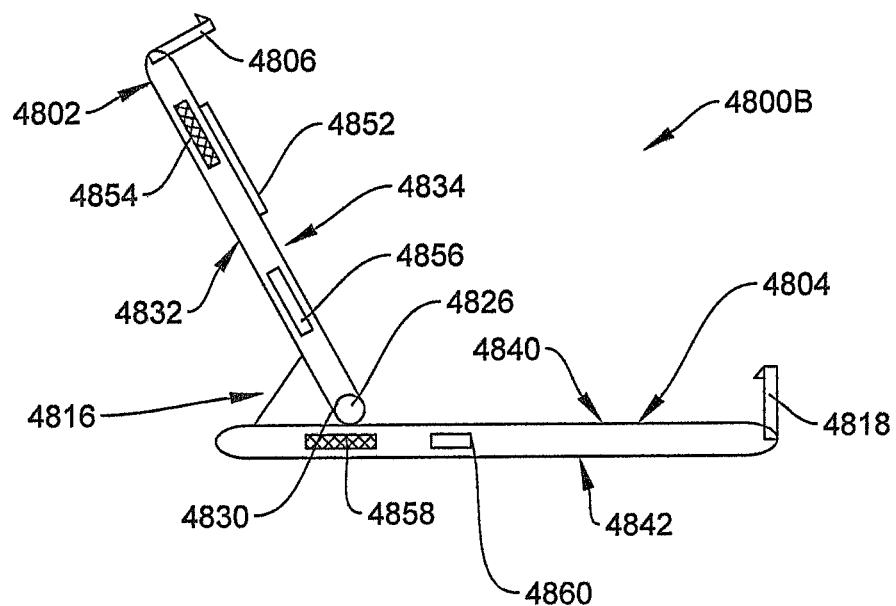
FIG. 49B shows a premium wallet incorporating a lever and a base.

FIG. 49B shows an embodiment of a premium wallet 4800B. In the figure, a lever 4802 is articulated with respect to a base 4804 via a spring means 4816. The lever has lever latch 4806 for mating with a base latch 4818. The lever 4802 includes an internal 4834 face intended to close against the base 4804 and an external face 4832 opposite the internal face. This wallet generally includes the features described in connection with the essential wallet above plus additional features.

Components and/or features visible on the internal face of the lever may include an internal LED screen 4852. Components and/or features integral with the lever may include internal screen electronic circuitry 4856 and may include a battery 4854. Notably, any wallet electronics mentioned here and above may reside on a single chip or on multiple chips.

The base 4804 includes an internal face 4840 intended to close against the lever 4802 and an external face 4842 opposite the internal face. Components and/or features integral with the base may include a battery 4858 and may include circuitry for charging the battery such as circuitry that harvests NFC power to charge the battery.

The screen 4852 provides a visible indication of information from wallet 4800B memory storage and information from other devices and services including transaction devices such as NFC devices, commercial services, financial services, software download services, and the like. For example, information stored in the wallet 4800B may include information related to cards generally, payment/credit cards, identification, commercial services such as transportation and airline services, entry codes/passwords/credentials, and the like. This information may be presented on the wallet screen and/or manipulated as required to carry out wallet functions.

In some embodiments, information from multiple cards/credit cards/payment cards may be copied to the wallet 4800B and use of this information for transactions may require entry such as contemporaneous entry of a fingerprint on the wallet fingerprint reader 4812. See the discussion of card copying above. In a similar fashion, use of other information stored on the wallet may require entry of fingerprint information.

Figure 49C:
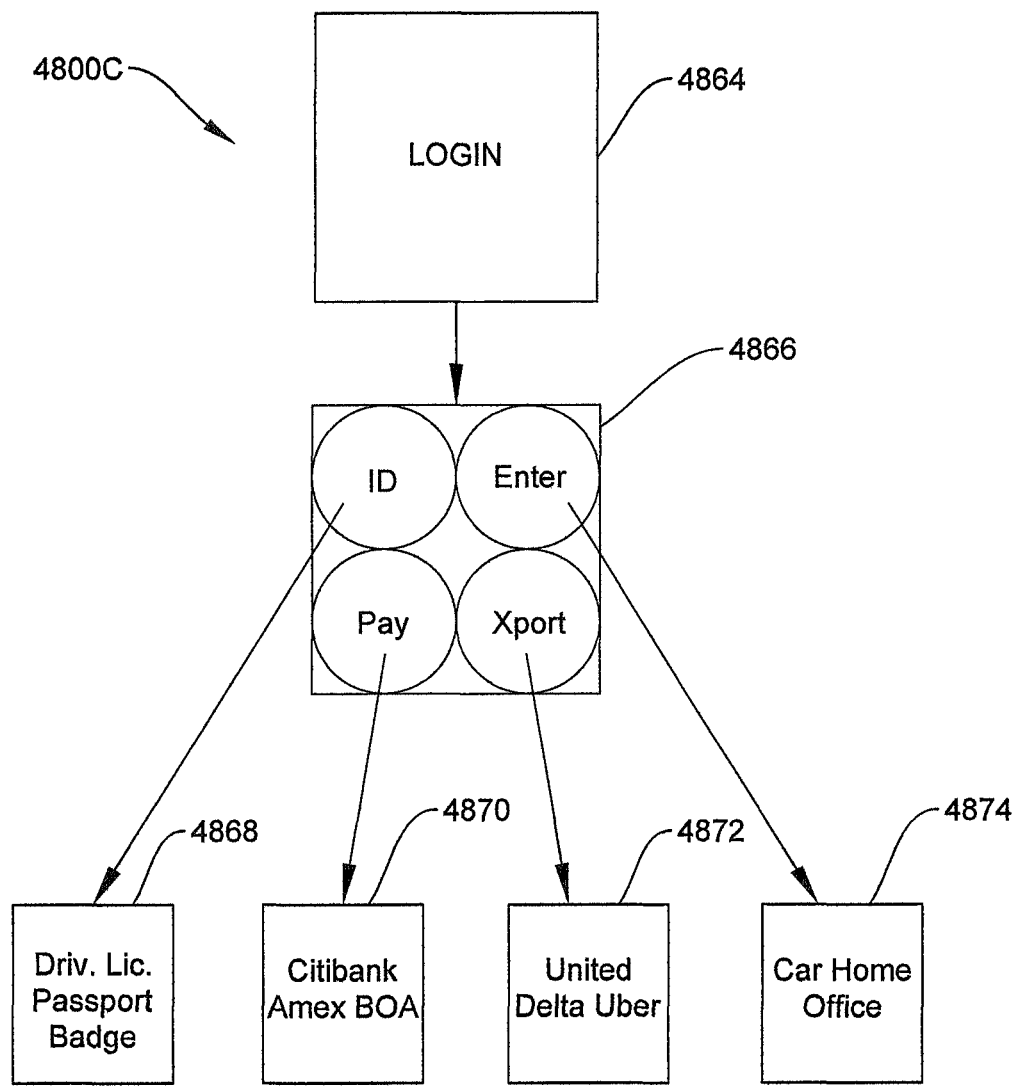
FIG. 49C shows menus or screen shots available on the premium wallet and on the ultimate wallet.

FIG. 49C shows exemplary screen shots 4800C that may be presented on the wallet internal screen 4852. A screen such as a first screen may present a login request 4864. After login, subsequent screens may offer selections from multiple classes of "transactions" 4866. Once a transaction class is selected, a subsequent screen may present multiple class-types for selection 4868, 4870, 4872, 4874.

For example, login may be accomplished biometrically using the wallet fingerprint reader 4812. After login, a class screen 4866 may offer a selection of classes such as a) ID (identification), b) Pay (e.g. use of paypal/credit/payment card), c) Enter (entry or use credentials), and d) Xport (transport and transport services).

Where the ID class is selected, multiple options may appear. These include a drivers license, a passport, or a badge/credential. Where the Pay class is selected, multiple options may appear. These include bank cards such as Citibank, Amex, and Bank of America. Where the Enter class is selected, multiple options may appear. These include access to a car, access to a home/residence, and access to an office or other protected space. Where the Xport class is selected, multiple options may appear. These include United Airlines, Delta Airlines or any airline and Uber or any transport service.

Ultimate Wallet

Figure 49D:
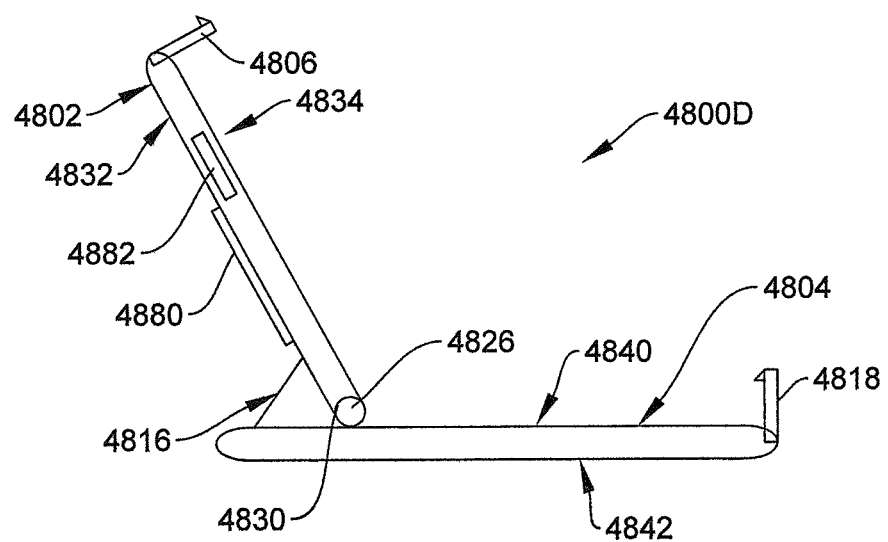
FIG. 49D shows an ultimate wallet incorporating a lever and a base.

FIG. 49D shows an embodiment of an ultimate wallet 4800D. In the figure, a lever 4802 is articulated with respect to a base 4804 via a spring means 4816. The lever has lever latch 4806 for mating with a base latch 4818. This wallet generally includes the features described in connection with the premium wallet above plus additional features.

The lever 4802 includes an internal 4834 face intended to close against the base 4804 and an external face 4832 opposite the internal face. The base 4804 includes an internal face 4840. The internal face is intended to close against the lever 4802 while an external face 4842 is opposite the internal face.

Components and/or features visible on the external face of the lever may include an external LED screen 4880 where any of the functions/displays of the internal screen 4852 may, where appropriate, be implemented. Components and/or features on or integral with the lever may include external screen electronic circuitry 4882. Notably, any wallet electronics mentioned here and above may reside on a single chip or on multiple chips.

The external screen 4852 may display user information such as directions or instructions pertaining to use of the wallet, news, time, weather, stock market quotes, wallet transactions including spending, usage versus credit card limits, map and/or directions, and the like. In various embodiments, the internal screen 4852 may display this information in lieu of or along with the external screen.

The external screen 4852 may display a logo. Logos may be those of credit services, bank services, payment services, suppliers of the wallet, or the like. For example, the logo of one or more entities such as Bank of America or AMEX may be presented. In various embodiments, the internal screen 4852 may display logos in lieu of along with the external screen.

The external screen 4852 may be used to request a login that provides limited or complete use of the electronic features of the wallet. For example, the screen may be touch sensitive, displaying a login request and then obtaining a user response such as a fingerprint on the screen to verify access. For example, a wallet microphone may accept a voice sample to verify access. For example, a wallet iris scanner may accept an iris scan to verify access. In various embodiments, the internal screen 4852 may operate in a similar manner in lieu of along with the external screen.

The external screen 4880 may be used in a dual authentication required for use of the electronic features of the wallet. For example, the external screen may require a first authentication method while another wallet device such as the internal screen 4852 may require a second authentication method.

The premium and ultimate wallets may be charged wirelessly or with wires such as with USB connectors, miniature/micro-miniature jacks, and specialty connectors.

In some embodiments, the external screen 4880 or the internal screen 4852 may be used as a fingerprint reader. Here, login by fingerprint may permit access to wallet operations including access to the classes and class types such as those shown in FIG. 49C.

In some embodiments the ultimate wallet includes internet access, GPS functionality, cell phone functionality, SMT, and camera functionality. Applications may also be downloaded to the wallet and installed such as online banking, barcode related payment systems, stock alerts, traffic maps and the like.

Any of the wallets above including the essential 4800A, premium 4800B, and ultimate 4800D wallets may receive card/document information via a wallet or a cell phone camera. Local or remote optical character recognition/photo recognition may be provided.

Biometric Identification

Any of the wallets above including the essential 4800A, premium 4800B, and ultimate 4800D wallets may provide biometric identification functions and capabilities.

In a first example a wallet owner obtains a verification application ("app") provided by an authority such as the department of motor vehicles (DMV). The app allows the wallet owner to photograph his/her ID (identification such as drivers license) and the app sends the photograph to the authority (DMV). The authority uses the ID photograph to verify that the information on the ID card matches the person identified by the card. If there is a match, the authority issues a verification number and transmits it to the wallet owner, for example by SMT on a smart phone. When received, the verification number is entered into the wallet, for example into a wallet secure memory.

Requests for identification can be answered by operating the wallet to produce the card information subject to finding the verification number stored in the wallet.

In a second example, ID card information can be captured by a wallet camera and sent to an authority for verification. Once verified, the wallet may receive a code from the authority. In some embodiments, the code provides the wallet with a means to verify that card information is associated with the individual identified by the card.

Requests for identification can be answered by operating the wallet to produce the ID information subject to finding the code stored in the wallet.

In a third example, ID card information can be sent along with the wallet owner's fingerprint such as a fingerprint from the wallet fingerprint reader. Here the authority verifies the card information and fingerprint are associated with the individual identified by the card. The code may be used by the wallet to allow association of the drivers license information with the wallet owner's fingerprint.

Requests for identification can be answered by operating the wallet to produce the DL information after entering the wallet owner's fingerprint on the wallet fingerprint reader.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A biometric wallet comprising:
a spring connecting a lever and a base;
a spring first end coupled to a base spring end and a spring second end rotatably fixed to a lever spring end;
the spring second end biased toward, but movable away from the base for removably capturing one or more sheet form items therebetween;
a first lever position with the lever over the base such that an external lever surface is visible and an internal lever surface is not visible;
a second lever position with an angle between the lever and the base that is an obtuse angle;
a lever latch end opposite the lever spring end with a first latch part; and,
a base latch end opposite the base spring end with a second latch part;
wherein the wallet is closed when the latch parts are engaged.

2. The wallet of claim 1 wherein the space between the spring ends is for receiving a card edge and a latch part is for preventing rotation of the opposite card edge.

3. The wallet of claim 2 wherein lifting the lever such that the biased spring end is lifted away from the base allows all items held by the spring to be removed from the wallet.

4. The wallet of claim 1 wherein the approximate dimensions of the card are 3⅜×2⅛ inches.

5. The wallet of claim 1 further comprising:
near the lever spring end, a fingerprint reader accessible from the lever internal surface; and,
a wallet antenna for radio communications between the wallet and near field communications (NFC) devices.

6. The wallet of claim 5 further comprising a card copying function wherein a card received in the mail is validated via phone or internet and all or part of the card digital content is transferred to a wallet memory.

7. The wallet of claim 6 wherein a fingerprint of an authorized card user is saved to a wallet memory.

8. The wallet of claim 7 wherein a non-biometric transaction using the card is replaced by a biometric transaction using the wallet when wallet communications with a near field device indicate card credentials being presented are for a valid card used by a person whose fingerprint matches a facsimile fingerprint stored in the wallet.

9. The wallet of claim 8 wherein the allowable value of a transaction using the biometric wallet is greater than the allowable value of a transaction using the card because the system processing the transaction receives an indication from the wallet that a biometric transaction is taking place.

10. The wallet of claim 1 further comprising:
a fingerprint reader accessible from a lever internal surface; and,
electronics for saving a facsimile of a fingerprint.

11. The wallet of claim 10 further comprising a card copying function wherein
a card received in the mail is enrolled by steps including storage of a facsimile of the recipient's fingerprint in a card memory and verification via phone or internet that this step has been completed; and,
transfer of all or a part of the card digital contents to a wallet memory.

12. The wallet of claim 11 wherein a fingerprint reader on the card provides the recipient's facsimile fingerprint.

13. The wallet of claim 12 wherein the person who saved a facsimile fingerprint on the card also saves a facsimile fingerprint to a wallet memory.

14. The wallet of claim 10 wherein a transaction using the card is replaced by a transaction using the wallet when wallet communications with a near field device indicate card credentials being presented are for a valid card used by a person whose fingerprint matches a facsimile fingerprint stored in the wallet.

15. The wallet of claim 14 further comprising a radio frequency blocker in the wallet base for preventing near field communications with cards held by the wallet.

16. The wallet of claim 15 wherein a wallet antenna is located in the lever such that when the lever is rotated away from the base the wallet antenna is separated from the radio frequency blocker by a distance sufficient to allow the wallet antenna to communicate with NFC transaction devices.

17. The wallet of claim 10 further comprising:
the wallet holding in memory credentials associated with multiple cards; and,
a wallet first LCD screen for selecting one of the multiple cards.

18. The wallet of claim 17 wherein the first LCD screen is accessible from the lever internal surface such that when the lever is in the first position both the fingerprint reader and the first LCD screen are protected by the base.

19. The wallet of claim 18 wherein a transaction using the selected card is replaced by a transaction using the wallet when wallet communications with a near field device indicate the card credentials being presented are for a valid card used by a person whose fingerprint matches a facsimile fingerprint stored in the wallet.

20. The wallet of claim 18 wherein one or both of the first wallet LCD screen and a second wallet LCD screen present a login request and upon a successful login present a selection of classes including "payments" and a selection of class types including a particular bank.

* * * * *